(12) United States Patent
Mizoguchi et al.

(10) Patent No.: US 9,868,885 B2
(45) Date of Patent: Jan. 16, 2018

(54) POLISHING MATERIAL PARTICLES, METHOD FOR PRODUCING POLISHING MATERIAL, AND POLISHING PROCESSING METHOD

(71) Applicant: KONICA MINOLTA, INC., Chiyoda-ku (JP)

(72) Inventors: Keisuke Mizoguchi, Hachioji (JP); Akihiro Maezawa, Hino (JP); Natsuki Ito, Hachioji (JP); Atsushi Takahashi, Musashino (JP); Hideaki Wakamatsu, Yokohama (JP); Yuuki Nagai, Tachikawa (JP); Chie Inui, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 167 days.

(21) Appl. No.: 14/910,986

(22) PCT Filed: Jul. 28, 2014

(86) PCT No.: PCT/JP2014/069830
§ 371 (c)(1),
(2) Date: Feb. 8, 2016

(87) PCT Pub. No.: WO2015/019888
PCT Pub. Date: Feb. 12, 2015

(65) Prior Publication Data
US 2016/0194538 A1    Jul. 7, 2016

(30) Foreign Application Priority Data

Aug. 7, 2013   (JP) ................................. 2013-164139
Aug. 8, 2013   (JP) ................................. 2013-164719

(51) Int. Cl.
*B24C 11/00*   (2006.01)
*C09K 3/14*    (2006.01)
(Continued)

(52) U.S. Cl.
CPC ............ *C09K 3/1409* (2013.01); *B24C 11/00* (2013.01); *C01F 17/0043* (2013.01); *C09G 1/02* (2013.01);
(Continued)

(58) Field of Classification Search
CPC . C09K 3/1463; C09K 3/1409; C01P 2004/32; C01P 2004/52; C01P 2004/54;
(Continued)

(56) References Cited

U.S. PATENT DOCUMENTS 4,845,201 A * 7/1989 Chauvin ................... C07C 5/03
                                                        534/15
5,015,452 A    5/1991 Matijevic
(Continued)

FOREIGN PATENT DOCUMENTS

| CN | 101304947 | 11/2008 |
|----|-----------|---------|
| JP | 11-35320  | 2/1999  |

(Continued)

OTHER PUBLICATIONS

B. Aiken, et al., "Preparation and Properties of Monodispersed Colloidal Particles of Lanthanide Compounds: III, Yttrium (III) and Mixed Yttrium/Cerium (III) Systems", Journal of American Ceramic Society, vol. 71, No. 10, pp. 845-853, 1988.

(Continued)

*Primary Examiner* — George Nguyen
(74) *Attorney, Agent, or Firm* — Cozen O'Connor

(57) ABSTRACT

Disclosed are polishing material particles which have polishing performance suitable for precision polishing and also have a high polishing speed and high monodispersibility; a polishing material containing the polishing material particles; and a polishing processing method using the polishing material. The polishing material particles are spherical particles having an average aspect ratio of 1.00 to 1.15, wherein (Continued)

the particle diameter ($D_{50}$ (nm)) of the polishing material particles as determined from a particle diameter cumulative distribution curve falls within the range from 50 to 1500 nm. The average content of cerium or the total content of cerium and at least one element selected from lanthanum (La), praseodymium (Pr), neodymium (Nd), samarium (Sm) and europium (Eu) in the polishing material particles is 81 mol % or more relative to the total content of all of rare earth elements that constitute the polishing material particles.

16 Claims, 5 Drawing Sheets

(51) Int. Cl.
 *C01F 17/00* (2006.01)
 *C09G 1/02* (2006.01)

(52) U.S. Cl.
 CPC ........ *C09K 3/1463* (2013.01); *C01P 2004/03* (2013.01); *C01P 2004/32* (2013.01); *C01P 2004/52* (2013.01); *C01P 2004/54* (2013.01); *C01P 2004/61* (2013.01); *C01P 2004/62* (2013.01); *C01P 2004/64* (2013.01)

(58) Field of Classification Search
 CPC .............. C01P 2004/61; C01P 2004/62; C01P 2004/64; B24C 11/00; C01F 7/0043
 USPC .......................................................... 451/36
 See application file for complete search history.

(56) References Cited

U.S. PATENT DOCUMENTS

| | | | | |
|---|---|---|---|---|
| 5,415,851 A | * | 5/1995 | Kimura | .................... C01B 25/37 252/301.4 P |
| 5,911,921 A | * | 6/1999 | Takai | ...................... C01B 25/37 252/584 |
| 6,561,874 B1 | * | 5/2003 | Kordonski | ................ B24C 5/00 451/36 |
| 6,887,566 B1 | * | 5/2005 | Hung | ..................... B82Y 30/00 106/286.1 |
| 2009/0199488 A1 | * | 8/2009 | Haerle | .................. B82Y 30/00 51/309 |
| 2012/0071318 A1 | * | 3/2012 | Matsueda | ............ B01D 53/945 502/170 |
| 2016/0194538 A1 | * | 7/2016 | Mizoguchi | .......... C01F 17/0043 451/36 |

FOREIGN PATENT DOCUMENTS

| | | |
|---|---|---|
| JP | 2003-020224 | 1/2003 |
| JP | 2008-515764 | 5/2008 |
| JP | 2009-515807 | 4/2009 |
| JP | 2010-526433 | 7/2010 |
| JP | 2013-135866 | 11/2011 |
| JP | 2013-110272 | 6/2013 |
| WO | WO 2012/101871 | 8/2012 |

OTHER PUBLICATIONS

M. Ocaña, "Preparation and Properties of uniform praseodymium-doped ceria colloidal particles", Colloid Polym Sci. 280: pp. 274-281 (2002) © Springer-Verlag 2002.

* cited by examiner

POLISHING MATERIAL PARTICLES, METHOD FOR PRODUCING POLISHING MATERIAL, AND POLISHING PROCESSING METHOD

RELATED APPLICATIONS

This is a U.S. National Phase Application under 35 USC 371 of International Application PCT/JP2014/069830 filed on Jul. 28, 2014.

This application claims the priority of Japanese application nos. 2013-164139 filed Aug. 7, 2013 and 2013-164719 filed Aug. 8, 2013, the entire content of both of which are hereby incorporated by reference.

FIELD OF INVENTION

The present invention relates to a particulate abrasive, a method for producing an abrasive material that contains the particulate abrasive, and a method of polishing processing using the abrasive material. More specifically, the present invention relates to a particulate abrasive that contain cerium oxide and has high polishing ability, a method for producing an abrasive material that contains the particulate abrasive, and a method of polishing processing that exhibits an improved polishing rate.

BACKGROUND ART

Rare-earth oxides composed of cerium oxide as a main component and other oxides, such as lanthanum oxide, neodymium oxide, and praseodymium oxide, have been used for abrasive materials used in fine polishing of glass optical elements or semiconductor devises in their manufacturing processes. While diamond, iron oxide, aluminum oxide, zirconium oxide, and colloidal silica have also been used for such abrasive materials, cerium-oxide-containing abrasive materials have been extensively used due to a high polishing rate and low surface roughness of a polished object (i.e., surface smoothness after polishing).

Commercially-available cerium oxide particles as abrasive materials are typically produced by pulverization. Particulate abrasives produced by pulverization have sharp edge structures on their surfaces thereby achieving a high polishing rate, but such particles readily form scratches on polished surfaces.

In general polishing methods, glass optical elements or semiconductor devises which require a high level of smoothness of an angstrom order are subjected to primary polishing with particles that achieve a high polishing rate, such as cerium oxide particles, and then secondary polishing with colloidal silica having a size of several tens of nanometers to improve the surface smoothness (i.e., to reduce the surface roughness).

Unfortunately, this method involves several polishing processes, resulting in a decrease in productivity. Furthermore, the smoothness of polished objects has been required to be higher than ever. Thus, development of a particulate abrasive having a spherical shape, keeping a high polishing rate, and causing less scratches which decreases the smoothness has been desired.

An abrasive material that is composed of high purity cerium oxide and suitable for fine polishing in manufacturing processes of, for example, glass optical elements has been produced as follows. A salt, e.g., a carbonate, a succinate or an acetate, is added to an aqueous cerium solution, e.g., an aqueous purified cerium(III) nitrate solution, an aqueous purified cerium(III) chloride solution or an aqueous purified cerium(III) sulfate solution, to form precipitate of a cerium salt, e.g., cerium carbonate, cerium succinate or cerium acetate, and then the precipitate is filtrated and dried, and is calcined to generate cerium oxide particles.

For example, Non-Patent Document 1 discloses a method for producing particles of an abrasive material precursor with a small particle size distribution. In this method, an aqueous precipitant solution that contains urea as a precipitant is added to an aqueous rare-earth element solution, e.g., an aqueous cerium nitrate solution or an aqueous yttrium nitrate solution, followed by heating with stirring.

The present inventors calcined cerium oxide precursor particles prepared in accordance with Non-Patent Document 1 to produce a particulate abrasive and replicated its abrasive effect. The inventors found that the cerium oxide particulate abrasive exhibits an unsatisfactorily low polishing rate, which is a significant problem for practical use. This low polishing rate was caused by a small relative level of cerium oxide on the surfaces in the particles because rare-earth elements other than cerium, e.g., yttrium, are contained in the particles to adjust the particle shapes and particle size distribution.

Meanwhile, Patent Document 1 discloses a method for producing a spherical rare-earth oxide particulate abrasive. In this method, an urea-based compound as a precipitant is added to an aqueous solution that contains cerium, at least one element selected from lanthanum, praseodymium, neodymium, samarium, and europium, and a salt of at least one element selected from yttrium, gadolinium, terbium, dysprosium, holmium, erbium, thulium, ytterbium, and lutetium to generate spherical particles of a basic rare-earth carbonate (i.e., particles of a rare-earth oxide precursor). These particles are then calcined to produce a spherical rare-earth oxide particulate abrasive.

In order to produce spherical particles by a method of Patent Document 1, at least one element selected from yttrium, gadolinium and the like should be contained in the aqueous solution in a concentration of 20 mol % or more.

Patent Documents 2 and 3 disclose methods for producing monodispersed spherical rare-earth oxide particles with gadolinium, terbium, europium, samarium, neodymium, dysprosium, holmium, erbium, thulium, and ytterbium.

Patent Documents 2 and 3, however, include no description of a method for producing monodispersed spherical oxide particles with cerium as a constituent element.

Non-Patent Document 2 discloses a method for producing rare-earth oxide particles by adding urea to an aqueous rare-earth inorganic salt solution, heating the resulting aqueous solution to precipitate an insoluble rare-earth element salt, and calcining the precipitate.

In a large-scale synthesis using this method of Non-Patent Document 2, anisotropically grown particles of various or indeterminate shapes are undesirably produced instead of spherical particles, resulted in an abrasive material with a large particle size distribution.

Patent Document 4 discloses a method for producing metal oxide particles by calcining a metal oxide prepared by heating a mixture that contains a metal salt, a polymer, and a high-boiling organic solvent.

This method of Patent Document 4 forms particles by aggregation of crystallites. Thus, these particles are not exactly spherical but have rough surfaces which readily form scratches on a polished object. Furthermore, these particles are readily broken during polishing processing because they are actually agglomerates of the aggregated particles.

In addition, an organic solvent used in this method of Patent Document 4 lowers the productivity because it requires high temperature reactions. This method further has a disadvantage in that particle sizes cannot be readily adjusted because a polymer used in this method remaining on the surface of particles to be subjected to calcination cause particle aggregation during the calcination.

In polishing with cerium oxide particles, it is believed that trivalent cerium on the surfaces of the particles breaks molecular bonds on a polished object to progress the polishing, if the particles have trivalent cerium on their surfaces and stable tetravalent cerium inside. In contrast, the agglomerated particles consisting of small aggregations of particles of Patent Document 4 have a slight difference in valence between in the surface and the interior of the agglomeration, and trivalent cerium is barely present on the surfaces of these agglomeration, which suggests that a high polishing rate cannot be achieved.

Patent Document 5 discloses a polishing method using composite particles wherein inorganic particles are disposed on organic particles. According to Patent Document 5, oxygen barely diffuses in the composite particle because the inorganic particle layer that covers the organic particle has a small thickness. Thus, the amount of trivalent cerium on the composite particle surface is undesirably small. In addition, the composite particles are too large to achieve a high smoothness.

PRIOR ART DOCUMENT

Patent Document

Patent Document 1: WO2012/101871
Patent Document 2: U.S. Pat. No. 5,015,452
Patent Document 3: JP Hei11-35320
Patent Document 4: JP 2013-110272
Patent Document 5: JP 2012-135866

Non-Patent Document

Non-Patent Document 1: J. Am. Ceram. Soc., Vol. 71, No. 10, pp. 845-853 (1988)
Non-Patent Document 2: Colloid Polym. Sci., Vol. 280, pp. 274-281 (2002)

SUMMARY OF INVENTION

Problems to be Solved by Invention

An object of the present invention, which has been made to resolve the problems, is to provide a particulate abrasive that is suitable for fine polishing, and exhibits a high polishing rate and high monodispersity, a method for producing an abrasive material that contains the particulate abrasive, and a method of polishing processing using the abrasive material.

Means for Solving Problems

The present inventors, who have conducted intensive studies to solve the above problems, have made a particulate abrasive by a synthetic process using an aqueous rare-earth salt solution and a precipitant, the particulate abrasive having the following particle profiles: an average aspect ratio of 1.00 to 1.15, which indicates high sphericity; a particle size $D_{50}$ (nm) within a certain range determined by a cumulative particle size distribution curve; and an average molar proportion of cerium to all rare-earth elements in the particulate abrasive, or a sum of molar proportions of cerium and at least one element selected from lanthanum (La), praseodymium (Pr), neodymium (Nd), samarium (Sm), and europium (Eu) to all rare-earth elements in the particulate abrasive of 81 mol % or more. Such a particulate abrasive has a polishing ability suitable for fine polishing, and achieves a high polishing rate and high monodispersity.

The above object of the present invention can be accomplished by the following items.

1. A particulate abrasive produced by a synthetic process using an aqueous rare-earth salt solution and a precipitant, wherein the particulate abrasive has a spherical shape and an average aspect ratio of 1.00 to 1.15;

the particulate abrasive has a particle size $D_{50}$ (nm) of to 1500 nm determined by a cumulative particle size distribution curve; and an average molar proportion of cerium to all rare-earth elements in the particulate abrasive, or a sum of molar proportions of cerium and at least one element selected from lanthanum (La), praseodymium (Pr), neodymium (Nd), samarium (Sm), and europium (Eu) to all rare-earth elements in the particulate abrasive, is 81 mol % or more.

2. The particulate abrasive according to Item 1, wherein the particle size $D_{50}$ (nm) determined by the cumulative particle size distribution curve ranges from 300 to 500 nm.

3. The particulate abrasive according to Item 1 or 2, wherein a maximum particle size $D_{max}$ (nm) determined by the cumulative particle size distribution curve ranges from 1.20 to 1.60 times the particle size $D_{50}$ (nm).

4. The particulate abrasive according to anyone of Items 1 to 3, wherein a particle size $D_{10}$ (nm) determined by the cumulative particle size distribution curve ranges from 0.70 to 0.95 times the particle size $D_{50}$ (nm).

5. The particulate abrasive according to anyone of Items 1 to 4, wherein a particle size $D_{90}$ (nm) determined by the cumulative particle size distribution curve ranges from 1.10 to 1.35 times the particle size $D_{50}$ (nm).

6. The particulate abrasive according to anyone of Items 1 to 5, wherein the particulate abrasive has an elemental composition satisfying the following requirements 1a to 3a.

1a) The particulate abrasive comprises at least one element selected from yttrium, gadolinium, terbium, dysprosium, holmium, erbium, thulium, ytterbium, and lutetium, in addition to cerium.

2a) The molar proportion of cerium in the particulate abrasive is 81 mol % or more.

3a) The molar proportion of the at least one element selected from yttrium, gadolinium, terbium, dysprosium, holmium, erbium, thulium, ytterbium, and lutetium in the particulate abrasive is 19 mol % or less.

7. The particulate abrasive according to anyone of Items 1 to 5, wherein the particulate abrasive has an elemental composition satisfying the following requirements 1b to 3b.

1b) The particulate abrasive comprises at least one element selected from yttrium, gadolinium, terbium, dysprosium, holmium, erbium, thulium, ytterbium, and lutetium, in addition to cerium.

2b) The molar proportion of cerium in the particulate abrasive is 90 mol % or more.

3b) The molar proportion of the at least one element selected from yttrium, gadolinium, terbium, dysprosium, holmium, erbium, thulium, ytterbium, and lutetium in the particulate abrasive is 10 mol % or less.

8. The particulate abrasive according to any one of Items 1 to 5, wherein the molar proportion of cerium ranges from 95 to 100 mol %.

9. A method for producing the particulate abrasive according to any one of Items 1 to 8, the method at least comprising the following steps.

Step A of preparing an aqueous precipitant solution involving dissolving a precipitant in an aqueous solvent at room temperature into a predetermined concentration and heating the aqueous solution in a closed vessel Step B of preparing an aqueous rare-earth salt solution containing at least cerium (Ce)

Step C of preparing a reaction mixture involving placing the aqueous rare-earth salt solution prepared in Step B into an open vessel and feeding the aqueous precipitant solution cooled to room temperature from the closed vessel to the open vessel Step D of generating a particulate abrasive precursor involving heating the reaction mixture with stirring in the open vessel Step E of separating the particulate abrasive precursor generated in Step D from the reaction mixture Step F of producing a particulate abrasive involving calcining the particulate abrasive precursor separated in Step E in an oxidizing atmosphere 10. A method for producing an abrasive that comprises the particulate abrasive according to any one of Items 1, 6 and 7, the method at least comprising the following steps.

Step 1 of preparing an aqueous rare-earth salt solution containing at least cerium (Ce)

Step 2 of placing the aqueous rare-earth salt solution prepared in Step 1 into a pressure vessel and heating the solution to 100° C. or higher Step 3 of preparing a reaction mixture involving feeding, under pressure, a precipitant solution contained in an open vessel kept at 65° C. or lower to the aqueous rare-earth salt solution contained in the pressure vessel and heated to 100° C. or higher in Step 2

Step 4 of generating a particulate abrasive precursor involving heating the reaction mixture to 100° C. or higher with stirring in the pressure vessel Step 5 of separating the particulate abrasive precursor generated in Step 4 from the reaction mixture Step 6 of producing a particulate abrasive involving calcining the particulate abrasive precursor separated in Step 5 in an oxidizing atmosphere 11. The method for producing the abrasive according to Item 10, wherein the aqueous rare-earth salt solution has an elemental composition satisfying the following requirements 1c to 3c.

1c) The aqueous rare-earth salt solution comprises at least one element selected from lanthanum (La), praseodymium (Pr), neodymium (Nd), samarium (Sm), europium (Eu), yttrium (Y), gadolinium (Gd), terbium (Tb), dysprosium (Dy), holmium (Ho), erbium (Er), thulium (Tm), ytterbium (Yb), and lutetium (Lu), in addition to cerium.

2c) In the aqueous rare-earth salt solution, a sum of molar proportions of cerium and the at least one element selected from lanthanum, praseodymium, neodymium, samarium, and europium to all rare-earth elements to be contained in the particulate abrasive is 81 mol % or more.

3c) In the aqueous rare-earth salt solution, a molar proportion of the at least one element selected from yttrium, gadolinium, terbium, dysprosium, holmium, erbium, thulium, ytterbium, and lutetium to all rare-earth elements to be contained in the particulate abrasive is 19 mol % or less.

12. The method for producing the abrasive according to Item 10 or 11, wherein the aqueous rare-earth salt solution has an elemental composition satisfying the following requirements 1d to 3d.

1d) The aqueous rare-earth salt solution comprises at least one element selected from yttrium, gadolinium, terbium, dysprosium, holmium, erbium, thulium, ytterbium, and lutetium, in addition to cerium.

2d) In the aqueous rare-earth salt solution, the molar proportion of cerium to all rare-earth elements to be contained in the particulate abrasive is 81 mol % or more.

3d) In the aqueous rare-earth salt solution, the molar proportion of the at least one element selected from yttrium, gadolinium, terbium, dysprosium, holmium, erbium, thulium, ytterbium, and lutetium to all rare-earth elements to be contained in the particulate abrasive is 19 mol % or less.

13. The method for producing the abrasive according to any one of Items 10 to 12, wherein the aqueous rare-earth salt solution has an elemental composition satisfying the following requirements 1e to 3e.

1e) The aqueous rare-earth salt solution comprises at least one element selected from yttrium, gadolinium, terbium, dysprosium, holmium, erbium, thulium, ytterbium, and lutetium, in addition to cerium.

2e) In the aqueous rare-earth salt solution, the molar proportion of cerium to all rare-earth elements to be contained in the particulate abrasive is 90 mol % or more.

3e) In the aqueous rare-earth salt solution, the molar proportion of the at least one element selected from yttrium, gadolinium, terbium, dysprosium, holmium, erbium, thulium, ytterbium, and lutetium to all rare-earth elements to be contained in the particulate abrasive is 10 mol % or less.

14. The method for producing the abrasive according to Item 10, wherein in the aqueous rare-earth salt solution, the molar proportion of cerium to all rare-earth elements to be contained in the particulate abrasive ranges from 95 to 100 mol %.

15. The method for producing the abrasive according to any one of Items 10 to 14, wherein the precipitant in the precipitant solution is urea or a urea-based compound.

16. A method of polishing processing, comprising performing polishing with the abrasive produced by the method according to any one of Items 9 to 15.

Effects of Invention

The above aspects of the present invention can provide a particulate abrasive that is suitable for fine polishing and exhibits a high polishing rate and high monodispersity, a method for producing an abrasive material that contains the particulate abrasive, and a method of polishing processing using the abrasive material.

Although no mode or mechanism of action is clearly revealed, the plausible hypothesis is as follows.

A particulate abrasive that contains cerium as a rare-earth element in a high proportion exhibits a high polishing rate. Meanwhile, if a particulate abrasive is produced by pulverization, its surface has sharp edge structures which achieve a high polishing rate but readily cause scratches on polished surfaces.

Chemical polishing with cerium oxide is performed in such a manner that electrons of oxygen on glass surfaces are withdrawn by unstable trivalent cerium in a particulate abrasive that has, on and near the surfaces, trivalent cerium ($Ce_2O_3$) in a larger amount than stable tetravalent cerium (CeO$_2$). In order to maximize the polishing ability of this cerium oxide, it is therefore important that a larger amount of trivalent cerium are present on the surface of cerium oxide particles.

Localization of trivalent cerium on the particle surface requires diffusion of oxygen atoms on the particle surface toward the particle center, whereby the particle surface is in a state of oxygen deficiency. To achieve the state of oxygen deficiency, a particulate abrasive should have certain particle volume that allow the diffusion of oxygen atom, i.e., should have certain thickness (or depth).

Meanwhile, a variation in thickness of the particulate abrasive leads to an unstable polishing rate and decreases the smoothness of a polished object. Thus, a particulate abrasive which has a spherical shape, which has no or a small variation in thickness (or depth), and in which the maximum use of the thickness (or depth) can be made is effective for a high level of smoothness and a high polishing rate.

The present inventors have found that a particulate abrasive that has a specific particle profile can achieve a high level of smoothness of a polished surface and a significantly high polishing rate. That is, such a particulate abrasive has an average aspect ratio of 1.00 to 1.15 and a particle size $D_{30}$ (nm) determined by a particle size cumulative distribution curve within a certain range. In addition, in the particulate abrasive, the average molar proportion of cerium to all the rare-earth elements in the particulate abrasive, or the sum of the molar proportions of cerium and at least one element selected from lanthanum (La), praseodymium (Pr), neodymium (Nd), samarium (Sm), and europium (Eu) to all the rare-earth elements in the particulate abrasive, is 81 mol % or more.

For producing an abrasive material that contains the above particulate abrasive, carbon dioxide and ammonia generated by urea hydrolysis or the like are needed for generating a precursor of the particulate abrasive to be contained in the abrasive material.

Based on such technical concept, one of effective methods for producing an abrasive material that contains the above particulate abrasive (hereinafter referred to as method A) involves Step A of preparing an aqueous precipitant solution involving dissolving a precipitant in an aqueous solvent at room temperature into a predetermined concentration and heating the aqueous solution in a closed vessel, Step B of preparing an aqueous rare-earth salt solution containing at least cerium (Ce), Step C of preparing a reaction mixture involving placing the aqueous rare-earth salt solution prepared in Step B into an open vessel and feeding the aqueous precipitant solution cooled to room temperature from the closed vessel to the open vessel, Step D of generating a particulate abrasive precursor involving heating the reaction mixture with stirring in the open vessel, Step E of separating the particulate abrasive precursor generated in Step D from the reaction mixture, and Step F of producing a particulate abrasive involving calcining the particulate abrasive precursor separated in Step E in an oxidizing atmosphere.

In another method for producing an abrasive material that contains the above particulate abrasive (hereinafter referred to as method B), an autoclave is used as a reaction vessel. Urea, etc. is fed to an aqueous rare-earth salt solution that has been heated close to its boiling point. Thermolysis of the added urea generates carbon dioxide and ammonia. Use of an autoclave as a reaction vessel can confine the generated carbon dioxide in the reaction system. Thus, this method can generate a particulate abrasive precursor which is a basic carbonate with high efficiency, and thus is effective for producing an abrasive material containing the particulate abrasive that contains spherical cerium particles which achieves a high level of smoothness.

EMBODIMENTS FOR CARRYING OUT INVENTION

Figure 1:
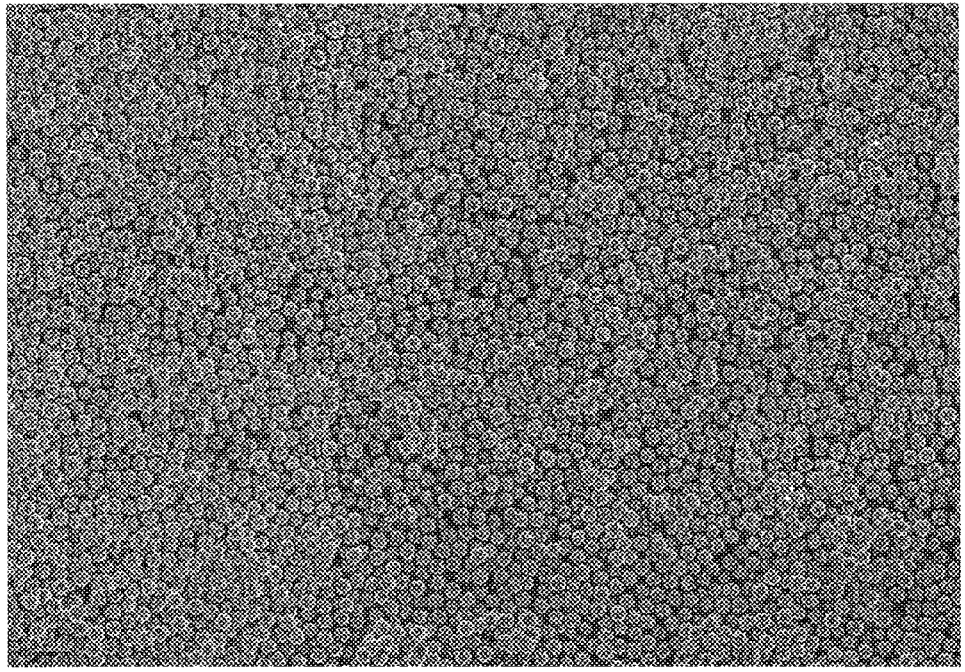
FIG. 1 is a scanning electron micrograph of a particulate abrasive according to an embodiment of the present invention.

The particulate abrasive of the present invention is produced by a synthetic process using an aqueous rare-earth salt solution and a precipitant, wherein the particulate abrasive has a spherical shape and an average aspect ratio of 1.00 to 1.15, the particulate abrasive has a particle size $D_{50}$ (nm) of 50 to 1500 nm determined by a cumulative particle size distribution curve, and the average molar proportion of cerium to all the rare-earth elements in the particulate abrasive, or the sum of the molar proportions of cerium and at least one element selected from lanthanum (La), praseodymium (Pr), neodymium (Nd), samarium (Sm), and europium (Eu) to all the rare-earth elements in the particulate abrasive, is 81 mol % or more. Inventions according to claims 1 to 16 all have these technical features in common.

To enhance the advantageous effects of the present invention, the particle size $D_{50}$ (nm) determined by the cumulative particle size distribution curve ranges preferably from 300 to 500 nm to further increase the surface smoothness and the polishing rate.

Preferably, the particulate abrasive has high monodispersity, namely, a maximum particle size $D_{max}$ (nm) determined by the cumulative particle size distribution curve ranging from 1.20 to 1.60 times the particle size $D_{50}$ (nm) to further increase the surface smoothness and the polishing rate.

Preferably, the particulate abrasive has significantly high monodispersity, namely, a particle size $D_{10}$ (nm) determined by the cumulative particle size distribution curve ranging from 0.70 to 0.95 times the particle size $D_{50}$ (nm), or a particle size $D_{90}$ (nm) determined by the cumulative particle size distribution curve ranging from 1.10 to 1.35 times the particle size $D_{50}$ (nm), to further increase the surface smoothness and the polishing rate.

Preferably, the particulate abrasive has an elemental composition satisfying all the above requirements 1a to 3a to exhibit high productivity (for example, a higher polishing rate) more suitable for fine polishing.

Preferably, the particulate abrasive has an elemental composition satisfying all the above requirements 1b to 3b to contain cerium in a higher molar proportion, exhibit higher polishing ability, and have a spherical shape.

Preferably, the molar proportion of cerium to all the rare-earth elements in the particulate abrasive ranges from 95 to 100 mol % to produce a particulate abrasive containing cerium in a high molar proportion and containing substantially no other rare-earth elements, and having high polishing ability (i.e., a high polishing rate) through reduced steps by virtue of the high molar proportion of cerium.

One method for producing the abrasive material that contains the particulate abrasive according to the present invention involves the following steps:

(1) Step A of preparing an aqueous precipitant solution involving dissolving a precipitant in an aqueous solvent at room temperature into a predetermined concentration and heating the aqueous solution in a closed vessel;

(2) Step B of preparing an aqueous rare-earth salt solution containing at least cerium (Ce);

(3) Step C of preparing a reaction mixture involving placing the aqueous rare-earth salt solution prepared in Step B into an open vessel and feeding the aqueous precipitant solution cooled to room temperature from the closed vessel to the open vessel;

(4) Step D of generating a particulate abrasive precursor involving heating the reaction mixture with stirring in the open vessel;

(5) Step E of separating the particulate abrasive precursor generated in Step D from the reaction mixture; and (6) Step F of producing a particulate abrasive involving calcining the particulate abrasive precursor separated in Step E in an oxidizing atmosphere.

In the present invention, this production method is referred to as method A.

Another method for producing the abrasive material that contains the particulate abrasive according to the present invention involves the following steps:

(1) Step 1 of preparing an aqueous rare-earth salt solution containing at least cerium (Ce);

(2) Step 2 of placing the aqueous rare-earth salt solution prepared in Step 1 into a pressure vessel and heating the solution to 100° C. or higher;

(3) Step 3 of preparing a reaction mixture involving feeding, under pressure, a precipitant solution contained in an open vessel kept at 65° C. or lower to the aqueous rare-earth salt solution contained in the pressure vessel and heated to 100° C. or higher in Step 2;

(4) Step 4 of generating a particulate abrasive precursor involving heating the reaction mixture with stirring to 100° C. or higher in the pressure vessel;

(5) Step 5 of separating the particulate abrasive precursor generated in Step 4 from the reaction mixture; and (6) Step 6 of producing a particulate abrasive involving calcining the particulate abrasive precursor separated in Step 5 in an oxidizing atmosphere.

In the present invention, this production method is referred to as method B.

To enhance the advantageous effects of the present invention, method B preferably uses an aqueous rare-earth salt solution having an elemental composition satisfying all the above requirements 1c to 3c to produce an abrasive material that contains a particulate abrasive more suitable for fine polishing and achieving higher productivity.

Preferably, method B of the present invention uses an aqueous rare-earth salt solution having an elemental composition satisfying all the above requirements 1d to 3d to produce an abrasive material that contains a particulate abrasive containing cerium in a high molar proportion, and having a spherical shape and high polishing ability.

Preferably, method B of the present invention uses an aqueous rare-earth salt solution having an elemental composition satisfying all the above requirements 1e to 3e to produce an abrasive material that contains a particulate abrasive containing cerium in a significantly high molar proportion, and having a spherical shape and high polishing ability.

Preferably, method B of the present invention uses an aqueous rare-earth salt solution in which the molar proportion of cerium ranges from 95 to 100 mol % to produce a particulate abrasive containing cerium in a high molar proportion and containing substantially no other rare-earth element, and having high polishing ability, through reduced steps.

Preferably, method B of the present invention uses urea or an urea-based compound as a precipitant to stably supply carbon dioxide and ammonia by hydrolysis.

According to one aspect of the present invention, the abrasive material produced by the method of the present invention is used in a method of polishing processing.

The particulate abrasive, the method for producing the abrasive material containing the particulate abrasive, and the method of polishing processing using the abrasive material of the present invention will now be described in more detail. In the present specification, every range includes its upper and lower limits.

In the present invention, the particulate abrasive is composed of particles having the same composition. The average aspect ratio and the particle size distribution parameters (i.e., $D_{50}$, $D_{10}$, $D_{90}$ and $D_{max}$) of the particulate abrasive are determined based on the particles. The abrasive material of the present invention is a slurry in which these particles are dispersed in water or an oil.

<<Abrasive Material>>

Typical known abrasive materials are slurries in which particles, such as particles of red iron oxide ($\alpha Fe_2O_3$), cerium oxide, aluminum oxide, manganese oxide, zirconium oxide, and colloidal silica, are dispersed in water or an oil.

The abrasive material of the present invention contains the cerium-oxide-containing particulate abrasive that can be used in chemical mechanical polishing (CMP) which involves both of mechanical and chemical effects to achieve a high level of smoothness and a sufficient polishing rate in polishing an object, for example, semiconductor devices and glasses.

The abrasive material of the present invention contains the particulate abrasive having the characteristics defined in claim 1. The content of the particulate abrasive having the characteristics of the present invention in the abrasive material of the present invention is preferably 80% or more by weight, more preferably 90% or more by weight, and most preferably 98% or more by weight.

<<Particulate Abrasive>>

The particulate abrasive of the present invention has a spherical shape, an average aspect ratio of 1.00 to 1.15, a particle size $D_{50}$ (nm) of 50 to 1500 nm determined by a cumulative particle size distribution curve, and the average molar proportion of cerium to all the rare-earth elements in the particulate abrasive, or the sum of molar proportions of cerium and at least one element selected from lanthanum (La), praseodymium (Pr), neodymium (Nd), samarium (Sm), and europium (Eu) to all the rare-earth elements in the particulate abrasive, is 81 mol % or more.

[Average Aspect Ratio]

The particulate abrasive of the present invention has a spherical shape and an average aspect ratio of 1.00 to 1.15.

The average aspect ratio of the present invention can be measured by the following method.

A scanning electron micrograph (SEM image) of the particulate abrasive is taken, and 100 particles in the micrograph are selected at random. The longest diameter a and the shortest diameter b are measured for each selected particle, and then the ratio a/b is calculated. An average of a/b values of the selected particles is defined as an average aspect ratio. The longest diameter a and the shortest diameter b are the length of the longer side and the length of the shorter side, respectively, of the circumscribed rectangle of each particle.

The particulate abrasive of the present invention has an average aspect ratio ranging preferably from 1.00 to 1.15, and more preferably from 1.00 to 1.05.

In the present invention, an particulate abrasive having an average aspect ratio of 1.00 to 1.15 is defined as spherical, and an particulate abrasive having an average aspect ratio over 1.15 is defined as indeterminate.

An average aspect ratio closer to 1.00 indicates higher sphericity. The abrasive material containing the particulate abrasive having high sphericity is suitable for fine polishing and exhibits a high polishing rate, and thus exhibits excellent polishing characteristics achieving high productivity.

Figure 2:
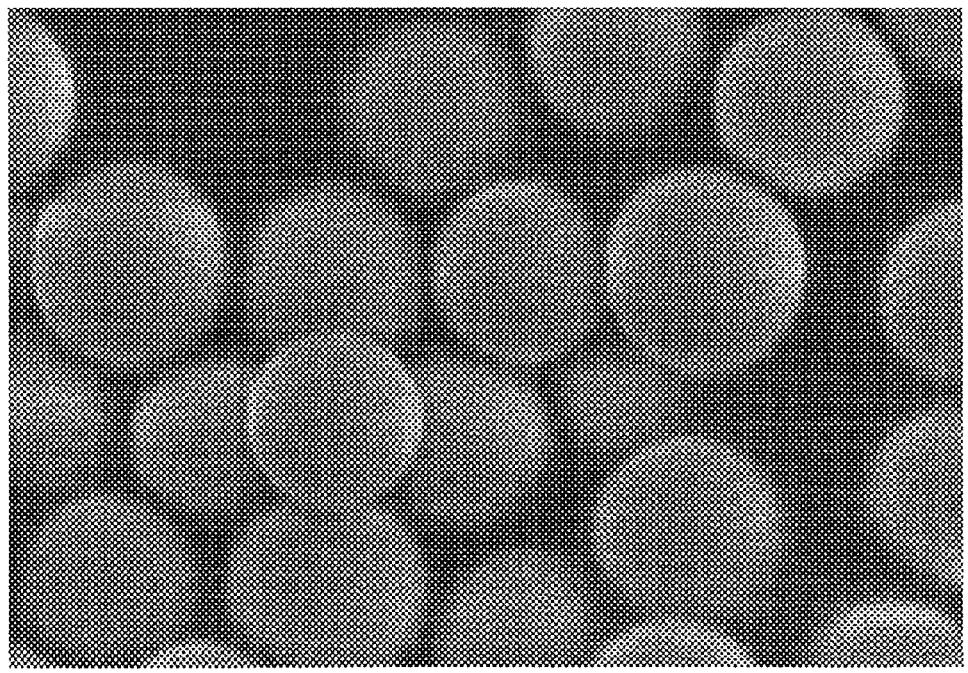
FIG. 2 is a scanning electron micrograph of a particulate abrasive according to another embodiment of the present invention.

FIG. 1 is a scanning electron micrograph (SEM image at a magnification of 1,000) of a particulate abrasive produced by method A for producing the abrasive material of the present invention. FIG. 2 is a scanning electron micrograph taken by magnifying the image of FIG. 1 at a magnification of 30,000. FIGS. 1 and 2 show that the particulate abrasive of the present invention has a spherical shape and high monodispersity. Method B can also produce a particulate abrasive having a shape and monodispersity equal or similar to those shown in FIGS. 1 and 2.

The monodispersity is a coefficient of variation in particle size distribution calculated based on a scanning electron micrograph (SEM image) of a certain number of the particles.

The level of monodispersity can be evaluated by, for example, calculating the coefficient of variation in particle size distribution (or monodispersity) based on a SEM image of 100 particles. The particle diameter of each particle is a projected area diameter calculated based on the area of each particle in a SEM image.

The coefficient of variation in particle size distribution is calculated by the following expression.

Coefficient of variation (%)=(standard deviation of particle size distribution/average particle diameter)×100

The above values, such as the particle size and the particle size distribution, can be measured with a device involving image processing, such as LUZEX AP manufactured by Nireco Corporation.

The coefficient of variation in particle size (i.e., monodispersity) of the particulate abrasive of the present invention is preferably 20.0% or less.

The abrasive material containing the particulate abrasive having high monodispersity barely causes scratches and thus has high polishing ability suitable for fine polishing.

Scratching can be confirmed by observing a polished surface of an object, such as a glass substrate.

The smoothness of a polished surface of an object can be evaluated by measuring the surface roughness Ra. For example, to evaluate the surface state (i.e., the surface roughness Ra) of a glass substrate, the surface roughness Ra of a glass substrate surface that has been polished for 30 minutes can be measured with a surface roughness measurer including a light wave interferometer, such as the dual-channel ZeMapper manufactured by Zygo Corporation. The surface roughness Ra is an arithmetic mean roughness measured by the method in accordance with JIS B0601-2001.

The surface roughness Ra of a polished surface is preferably 10 Å or less, and more preferably ranges from 3.0 to 8.0 Å.

In the method for producing the abrasive material of the present invention, a particulate abrasive having an average aspect ratio of 1.00 to 1.15 can be produced by a synthetic process using an aqueous rare-earth salt solution and a precipitant, instead of pulverization. This method involves the followings: cerium-containing basic rare-earth carbonate (i.e., particulate abrasive precursor) is prepared by (1) adding an aqueous precipitant solution, e.g., an aqueous urea solution, to an aqueous rare-earth salt solution heated to a high temperature (e.g., 90° C. or higher) in a closed vessel to decompose the urea into carbon dioxide gas and ammonia at the high temperature, or by (2) heating an aqueous precipitant solution in a closed vessel to a high temperature in advance and then adding the heated aqueous precipitant solution in which urea has been decomposed into carbon dioxide gas and ammonia to an aqueous rare-earth salt solution; and the particulate abrasive precursor is then calcined to produce a cerium-oxide-containing particulate abrasive having a spherical shape and an average aspect ratio of 1.00 to 1.15.

In the present invention, a specific way to produce a particulate abrasive having an average aspect ratio ranging from 1.00 to 1.15 involves control or adjustment of, as needed, a time for mixing the aqueous rare-earth salt solution with the aqueous precipitant solution at a high temperature, a time and/or temperature for the reaction of these solutions, a concentration(s) of the aqueous rare-earth salt solution and/or the aqueous precipitant solution at the mixing, and/or a time and/or temperature for the calcination, in the above preparations using the aqueous rare-earth salt solution and/or the aqueous precipitant solution.

[Particle Size Distribution Parameter]

The particulate abrasive of the present invention has a particle size $D_{50}$ (nm) of 50 to 1500 nm determined by a cumulative particle size distribution curve.

Preferably, the particle size $D_{50}$ (nm) ranges from 300 to 500 nm, the maximum particle size $D_{max}$ (nm) ranges from 1.20 to 1.60 times the particle size $D_{50}$ (nm), the particle size $D_{10}$ (nm) ranges from 0.70 to 0.95 times the particle size $D_{50}$ (nm), and the particle size $D_{90}$ (nm) ranges from 1.10 to 1.35 times the particle size $D_{50}$ (nm).

The cumulative particle size distribution curve of the present invention can be drawn in the following way.

An image (i.e., a SEM image) of the particulate abrasive is taken with a scanning electron microscope, and 100 particles in the image are selected at random. A diameter of a circle that has the same area as the selected particle is then calculated to obtain the diameter of each selected particle.

In the next stage, the calculated diameters of the particles are plotted along the abscissa, and the cumulative numbers of the particles of the particulate abrasive are plotted along the ordinate (an integral curve) to draw a cumulative particle size distribution of the particulate abrasive.

Figure 3:
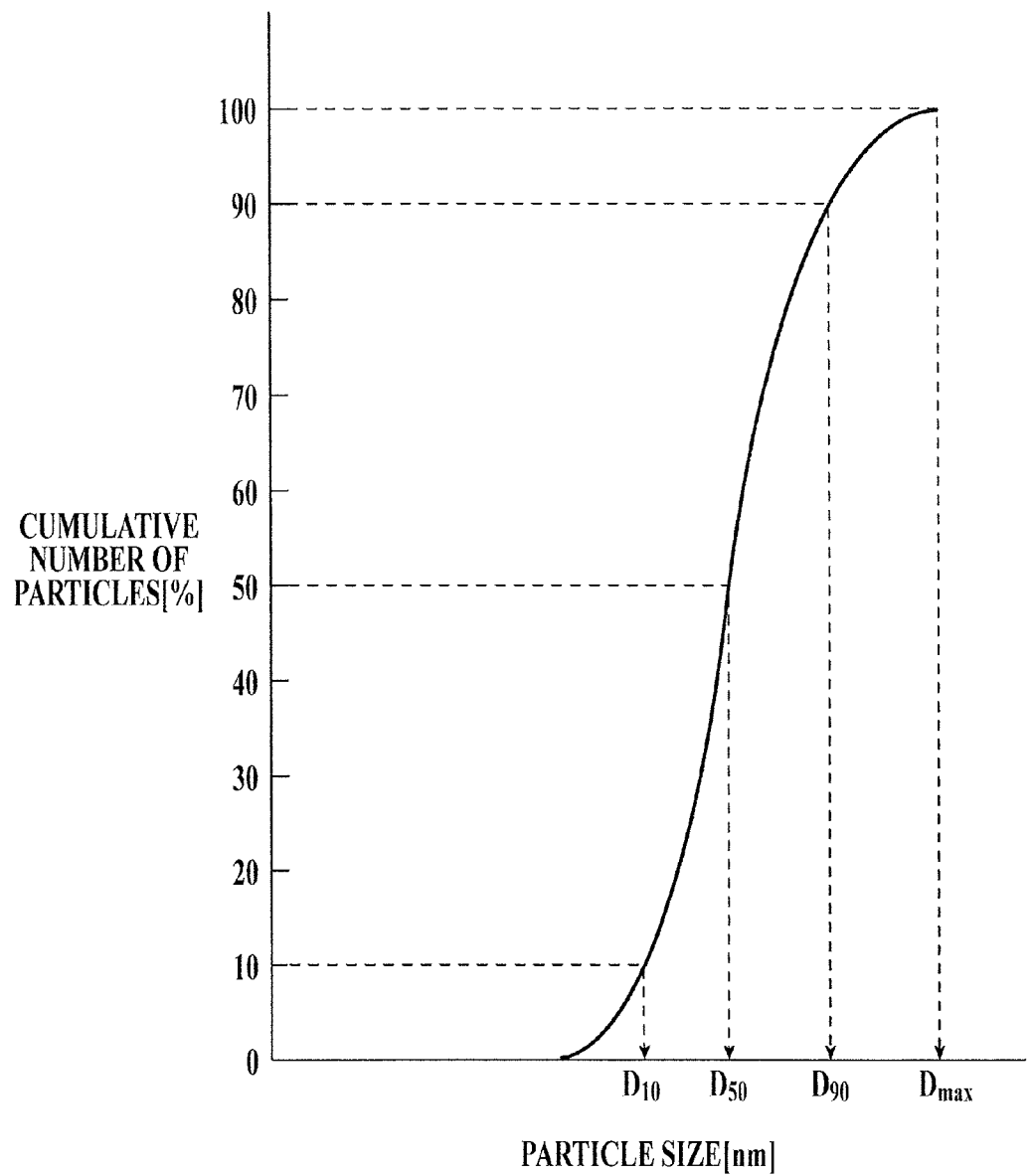
FIG. 3 is a cumulative particle size distribution curve of a particulate abrasive according to an embodiment of the present invention.

FIG. 3 is an example of the cumulative curve of the particulate abrasive (i.e., an integral curve of particles) drawn in accordance with such a way.

The cumulative curve of FIG. 3 is drawn by plotting the cumulative number of 100 particles each having a certain particle diameter (nm) versus the particle diameter along the abscissa in ascending order.

The particle diameter at a cumulative number of 50% in the cumulative curve of FIG. 3 is defined as $D_{50}$. Likewise, the particle diameter at a cumulative number of 10% in the cumulative curve of FIG. 3 is defined as $D_{10}$, the particle diameter at a cumulative number of 90% in the cumulative curve of FIG. 3 is defined as $D_{90}$, and the particle diameter at a cumulative number of 100% in the cumulative curve of FIG. 3 is defined as $D_{max}$.

The ratio(s) of $D_{10}$, $D_{90}$, or $D_{max}$ to the median value $D_{50}$ within the above range(s) indicates that the particle size distribution is small and the particulate abrasive has high monodispersity.

In the present invention, the above particle size distribution parameters can be achieved by control or adjustment of, as needed, a time for mixing the aqueous rare-earth salt solution with the aqueous precipitant solution at a high temperature, a time and/or temperature for the reaction of these solutions, and/or a concentration(s) of the aqueous rare-earth salt solution and/or the aqueous precipitant solution at the mixing, in the above preparations.

[Monodispersity: Coefficient of Variation in Particle Size Distribution]

The monodispersity (i.e., a coefficient of variation in particle size distribution), which is another parameter of the particle size distribution of the particulate abrasive, will now be described.

In the present invention, the monodispersity can be determined based on a coefficient of variation in particle size distribution which can be calculated from a scanning electron micrograph (a SEM image) of the certain number of the particles of the particulate abrasive.

The level of monodispersity can be evaluated by, for example, calculating a coefficient of variation in particle size distribution (i.e., monodispersity) from a SEM image of 100 particles of the particulate abrasive. The particle size of each particle is a projected area diameter calculated based on the area of each particle in the SEM image.

A coefficient of variation in particle size distribution (hereinafter also referred to as a CV) is calculated by the following expression.

Coefficient of Variation (%)=(standard deviation of particle size distribution/average particle diameter)×100

The above values, such as the particle size and the particle size distribution, can be measured with an image analyzer (such as LUZEX AP manufactured by Nireco Corporation).

[Elemental Composition of Particulate Abrasive]

In the present invention, an average molar proportion of cerium to all the rare-earth elements in the particulate abrasive of 81 mol % or more, or a sum of molar proportions of cerium and at least one element selected from lanthanum (La), praseodymium (Pr), neodymium (Nd), samarium (Sm), and europium (Eu) to all the rare-earth elements in the particulate abrasive of 81 mol % or more.

Preferably, the particulate abrasive of the present invention has an elemental composition satisfying all the following requirements 1a to 3a.

1a) The particulate abrasive comprises at least one element selected from yttrium, gadolinium, terbium, dysprosium, holmium, erbium, thulium, ytterbium, and lutetium, in addition to cerium.

2a) The molar proportion of cerium to all the rare-earth elements in the particulate abrasive is 81 mol % or more.

3a) The molar proportion of at least one element selected from yttrium, gadolinium, terbium, dysprosium, holmium, erbium, thulium, ytterbium and, lutetium to all the rare-earth elements in the particulate abrasive is 19 mol % or less.

The molar proportion of each rare-earth element in the particulate abrasive can be measured by an elemental analysis. For example, 1 g of the particulate abrasive is dissolved in a mixture of 10 ml of an aqueous nitric acid solution and 1.0 ml of a hydrogen peroxide solution, and then an elemental analysis is performed on the resulting mixture with an inductively coupled plasma atomic emission spectrometer (ICP-AES) manufactured by SII nanotechnology Inc. In this way the molar proportion (mol %) of each rare-earth element can be determined based on the contents of the rare-earth elements in the particulate abrasive.

The elemental composition of the particulate abrasive can also be measured by an elemental analysis on a cross section of the particulate abrasive. For example, the particulate abrasive is cut to form a cross-sectional surface close to the center of the particle with a focused ion beam device FB-2000A manufactured by Hitachi High-Technologies Corporation. An elemental analysis is then performed on the cross section with STEM-EDX (HD-2000) manufactured by Hitachi High-Technologies Corporation to determine the elemental composition for the rare-earth elements in the particulate abrasive.

A higher molar proportion of cerium in the particulate abrasive of the present invention leads to a higher polishing rate.

In the present invention, the polishing rate can be measured from polishing processing on an object surface with an abrasive cloth, involving feeding an abrasive material slurry in which a powder abrasive material containing the particulate abrasive is dispersed in a dispersion medium, such as water, to the object surface.

The polishing rate can be measured from a polishing processing involving repetitive feeding of an abrasive material slurry to a polisher, for example. Specifically, the thicknesses before and after the polishing processing are measured with Digimicro (MF501) manufactured by Nikon Corporation, and a difference between these thicknesses is used to calculate the polishing rate, i.e., the polished depth (μm) per minute. Details of the measurement of the polishing rate will be described in Examples with reference to FIG. 6.

Preferably, the particulate abrasive of the present invention has an elemental composition further satisfying all the following requirements 1b to 3b.

1b) The particulate abrasive comprises at least one element selected from yttrium, gadolinium, terbium, dysprosium, holmium, erbium, thulium, ytterbium, and lutetium, in addition to cerium.

2b) The molar proportion of cerium to all the rare-earth elements in the particulate abrasive is 90 mol % or more.

3b) The molar proportion of at least one element selected from yttrium, gadolinium, terbium, dysprosium, holmium, erbium, thulium, ytterbium, and lutetium to all the rare-earth elements in the particulate abrasive is 10 mol % or less.

These requirements reduces the molar proportion of at least one element selected from yttrium, gadolinium, terbium, dysprosium, holmium, erbium, thulium, ytterbium, and lutetium, which is contained in the particulate abrasive in addition to cerium, and can reduce a production cost while ensuring a spherical shape.

In addition, the particulate abrasive of the present invention preferably has a molar proportion of cerium to all the rare-earth elements in the particulate abrasive ranging from 95 to 100 mol %, and has a spherical shape.

The abrasive material containing the particulate abrasive having a molar proportion of cerium to all the rare-earth elements in the particulate abrasive ranging from 95 to 100 mol % and a spherical shape exhibits a significantly high polishing rate by virtue of the high molar proportion of cerium.

<<Method for Producing Abrasive Material>>

Methods A and B for producing the abrasive material of the present invention will now be described.

[Method A for Producing Abrasive Material]

Figure 4:
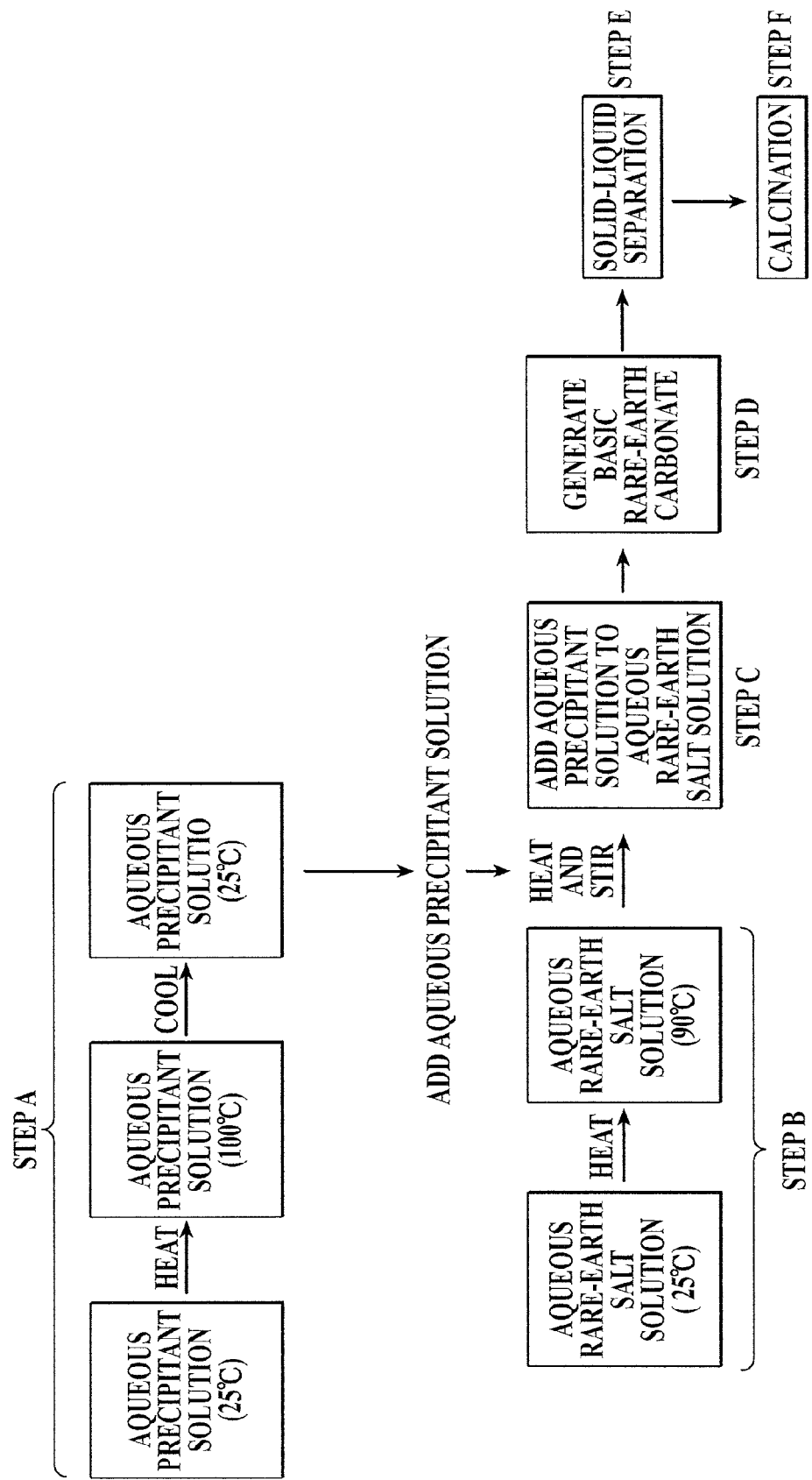
FIG. 4 is a schematic diagram illustrating a flow process chart in accordance with method A as a method for producing a particulate abrasive according to an embodiment of the present invention.

Method A for producing the abrasive material containing the particulate abrasive of the present invention mainly involves 6 steps of FIG. 4 (Step A of preparing an aqueous precipitant solution, Step B of preparing an aqueous rare-earth salt solution, Step C of feeding the aqueous precipitant solution (generation of nuclear particle), Step D of heating with stirring (growth of particle), Step E of solid-liquid separation, and Step F of calcination).

These steps will now be described in sequence in detail.

[Step A: Preparation of Aqueous Precipitant Solution]

In Step A (step of preparing an aqueous precipitant solution) of FIG. 4, a precipitant is dissolved in an aqueous solvent at room temperature into a predetermined concentration and then the resulting solution is heated in a closed vessel. In this way the aqueous precipitant solution used in the feeding is prepared.

For example, 0.5 L of a 5.0 mol/L aqueous precipitant solution is prepared, and then heated at 100° C. for 6 hours. The heated solution was cooled to 20° C. In this way the aqueous precipitant solution of the present invention can be prepared.

The heating of an aqueous precipitant solution in a closed vessel can prompt hydrolysis while retaining the solvent. The precipitant is preferably urea or a urea-based compound because hydrolysis of urea or a urea-based compound steadily generate carbon dioxide and ammonia.

Other preferred examples of the precipitant include salts of urea (e.g., urea nitrate and urea hydrochloride), N,N-dimethyl-N'-acetylurea, N,N'-dibenzoylurea, benzenesulfonyl urea, p-toluenesulfonyl urea, trimethylurea, tetraethylurea, tetramethylurea, triphenylurea, tetraphenylurea, N-benzoylurea, methyl isourea, ethyl isourea, and ammonium hydrogen carbonate. In Examples described later, an aqueous urea solution was used to generate a basic rare-earth carbonate, but this is merely an example and the present invention should not be limited to the aqueous urea solution.

[Step B: Preparation of Aqueous Rare-Earth Salt Solution]

In Step B (preparation of an aqueous rare-earth salt solution) of FIG. 4, an aqueous rare-earth solution in which the molar proportion of cerium to all the rare-earth elements is 81 mol % or more is prepared. The prepared aqueous rare-earth salt solution is then heated to, for example, 90° C.

Specifically, the aqueous rare-earth salt solution having an elemental composition satisfying the requirements 1a to 3a, the aqueous rare-earth salt solution having an elemental composition satisfying the requirements 1b to 3b, or the aqueous rare-earth salt solution having a molar proportion of cerium to all the rare-earth elements to be contained in the particulate abrasive of 95 to 100 mol % is prepared.

The ion concentration of the aqueous rare-earth salt solution of the present invention, i.e., the aqueous rare-earth salt solution having a molar proportion of cerium to all the rare-earth elements to be contained in the particulate abrasive of 81 mol % or more and containing at least one element selected from yttrium, gadolinium, terbium, dysprosium, holmium, erbium, thulium, ytterbium, and lutetium, or the aqueous rare-earth salt solution having a molar proportion of cerium to all the rare-earth elements to be contained in the particulate abrasive of 95 to 100 mol %, ranges preferably from 0.001 to 0.1 mol/L.

The ion concentration in the aqueous precipitant solution, e.g., the ion concentration in the aqueous urea solution, ranges preferably from 5 to 50 times the ion concentration of the aqueous rare-earth salt solution.

The monodispersed particulate abrasive having a spherical shape can be produced by the above range of the ion concentration of the aqueous rare-earth salt solution having a molar proportion of cerium to all the rare-earth elements to be contained in the particulate abrasive of 81 mol % or more and containing at least one element selected from yttrium, gadolinium, terbium, dysprosium, holmium, erbium, thulium, ytterbium, and lutetium, the ion concentration of the aqueous rare-earth salt solution having a molar proportion of cerium to all the rare-earth elements to be contained in the particulate abrasive of 95 to 100 mol %, and the ion concentration of the aqueous precipitant solution (e.g., an aqueous urea solution).

Salts of the above elements used for preparing the aqueous rare-earth salt solution of the present invention can be, for example, nitrates, hydrochlorides, and/or sulfates. Preferred examples of the salts include cerium nitrate, yttrium nitrate, gadolinium nitrate, terbium nitrate, dysprosium nitrate, holmium nitrate, erbium nitrate, thulium nitrate, ytterbium nitrate, and lutetium nitrate. These nitrates can produce an abrasive material containing less impurities.

[Step C: Feeding of Aqueous Precipitant Solution]

Subsequent to Step B, as shown in FIG. 4, the aqueous precipitant solution prepared in Step A (preparation of an aqueous precipitant solution) is fed to the aqueous rare-earth salt solution prepared and heated in Step B (preparation of an aqueous rare-earth salt solution), and the resulting mixture is then heated with stirring to prepare a reaction mixture.

The aqueous precipitant solution and the aqueous rare-earth salt solution are mixed at high temperature. Thereby carbon dioxide and ammonia in the aqueous precipitant solution react with the aqueous rare-earth salt solution to generate nuclear particles of the articulate abrasive.

A high rate of the feeding of the aqueous precipitant solution is preferred to achieve higher monodispersity. The rate of the feeding is preferably 0.5 mL/min or more, and more preferably 1.0 mL/min or more. A high rate of the feeding of the aqueous precipitant solution forms the nuclear particles generated by the fed aqueous precipitant solution into a spherical shape, avoiding anisotropic growth the nuclear particles.

[Step D: Heating with Stirring (Growth of Particle)]

Subsequent to Step C, the mixture containing dispersion of the nuclear particles prepared in Step C is heated with stirring at a constant temperature for a certain time to ripen and grow the nuclear particles. In this way a basic rare-earth carbonate as a particulate abrasive precursor is generated.

The heating temperature in Step D is preferably 80° C. or higher, and more preferably 90° C. or higher. The stirring time is preferably 1 hour or more and 10 hours or less, and more preferably 1 hour or more and 3 hours or less. The heating temperature and the stirring time can be adjusted as needed depending on a target particle size.

For the stirring, a mixer having any structure can be used without limitation within the scope achieving a sufficient stirring efficiency. To achieve a high stirring efficiency, a rotor-stator mixer is preferred.

In the present invention, conditions of Steps C and D can be adjusted to achieve a target range of the particle size $D_{50}$, $D_{10}$, $D_{90}$, or $D_{max}$ calculated from the cumulative particle size distribution.

For example, a decrease in the time for mixing the aqueous precipitant solution with the aqueous rare-earth salt solution increases the number of the nuclear particles, whereby the particle size $D_{50}$, $D_{10}$, $D_{90}$, or $D_{max}$ decreases, because the number of the grown particles decreases, and consequently, the sizes of the grown particles decreases. In contrast, an increase in the mixing time decreases the number of the nuclear particles, and consequently, the nuclear particles grow larger.

An increase in the heating time with stirring (i.e., the ripening time) after the generation of the nuclear particles in Step D facilitates the growth of the nuclear particles and generates more largely grown particles as a particulate abrasive precursor. Likewise, an increase in the reaction temperature facilitates the growth of the nuclear particles and increases the particle size parameters, such as $D_{50}$.

A higher concentration of the aqueous rare-earth salt solution to which the aqueous precipitant solution is fed in Step C (feeding of the aqueous precipitant solution) increases the particle size parameters, such as the particle sizes $D_{max}$ and $D_{90}$, can be increased, whereas a lower concentration of the aqueous rare-earth solution prepared to which the aqueous precipitant solution is fed in Step C (feeding of the aqueous precipitant solution) increases the particle size $D_{10}$.

Concerning an aspect ratio and monodispersity, a longer heating time with stirring (i.e., a longer ripening time) after the formation of the nuclear particles in Step D increases the monodispersity and the sphericity of the particulate abrasive, because such an increase causes Ostwald ripening involving dissolution of microparticles and the growth of the particles of the particulate abrasive precursor.

[Step E: Solid-Liquid Separation]

Subsequent to the heating with stirring, solid-liquid separation is performed to separate the precipitate (i.e., the particulate abrasive precursor or a basic rare-earth carbonate) from the reaction mixture with a solid-liquid separation device. Any traditional procedure can be used in this solid-liquid separation. For example, the particulate abrasive precursor is separated from the reaction mixture by filtration with, for example, a filter for solid-liquid separation.

[Step F: Calcination]

In Step F (calcination), the particulate abrasive precursor prepared in Step E (solid-liquid separation) is calcined in air or an oxidizing atmosphere at 400° C. or higher. The calcined particulate abrasive precursor is an oxide, i.e., a cerium-oxide-containing particulate abrasive. In Step F (calcination), the aspect ratio of the particulate abrasive of the present invention can be adjusted under control of the calcination temperature within the range of 700 to 1000° C.

The particulate abrasive precursor may be cleaned with, for example, water or alcohol and dried before the calcination, as needed.

After the calcination, the particulate abrasive is cooled to stabilize the particulate abrasive, and then a bulk of the cooled particulate abrasive is prepared as an abrasive material.

This method for producing the abrasive material can prepare an abrasive material that contains a particulate abrasive having a spherical shape and a small particle size distribution, and does not substantially contain anisotropically grown particles.

The content of the particulate abrasive in the abrasive material of the present invention preferably 50% by weight or more, more preferably 70% by weight or more, and most preferably 90% by weight or more to achieve a small surface roughness Ra of a polished object.

[Method B for Producing Abrasive Material]

Method B for producing the abrasive material containing the particulate abrasive of the present invention involves at least the following Steps 1 to 6 to produce an abrasive material containing a cerium-oxide-containing particulate abrasive.

Step 1: an aqueous rare-earth salt solution containing at least cerium (Ce) is prepared;

Step 2: the aqueous rare-earth salt solution prepared in Step 1 is placed into a pressure vessel and then the solution is heated to 100° C. or higher;

Step 3: a reaction mixture is prepared by feeding, under pressure, a precipitant solution contained in an open vessel kept at 65° C. or lower to the aqueous rare-earth salt solution contained in the pressure vessel and heated to 100° C. or higher in Step 2;

Step 4: a particulate abrasive precursor is generated by heating the reaction mixture with stirring to 100° C. or higher in the pressure vessel;

Step 5: the particulate abrasive precursor generated in Step 4 is separated from the reaction mixture;

Step 6: a particulate abrasive is produced by calcining the particulate abrasive precursor separated in Step 5 in an oxidizing atmosphere.

Figure 5:
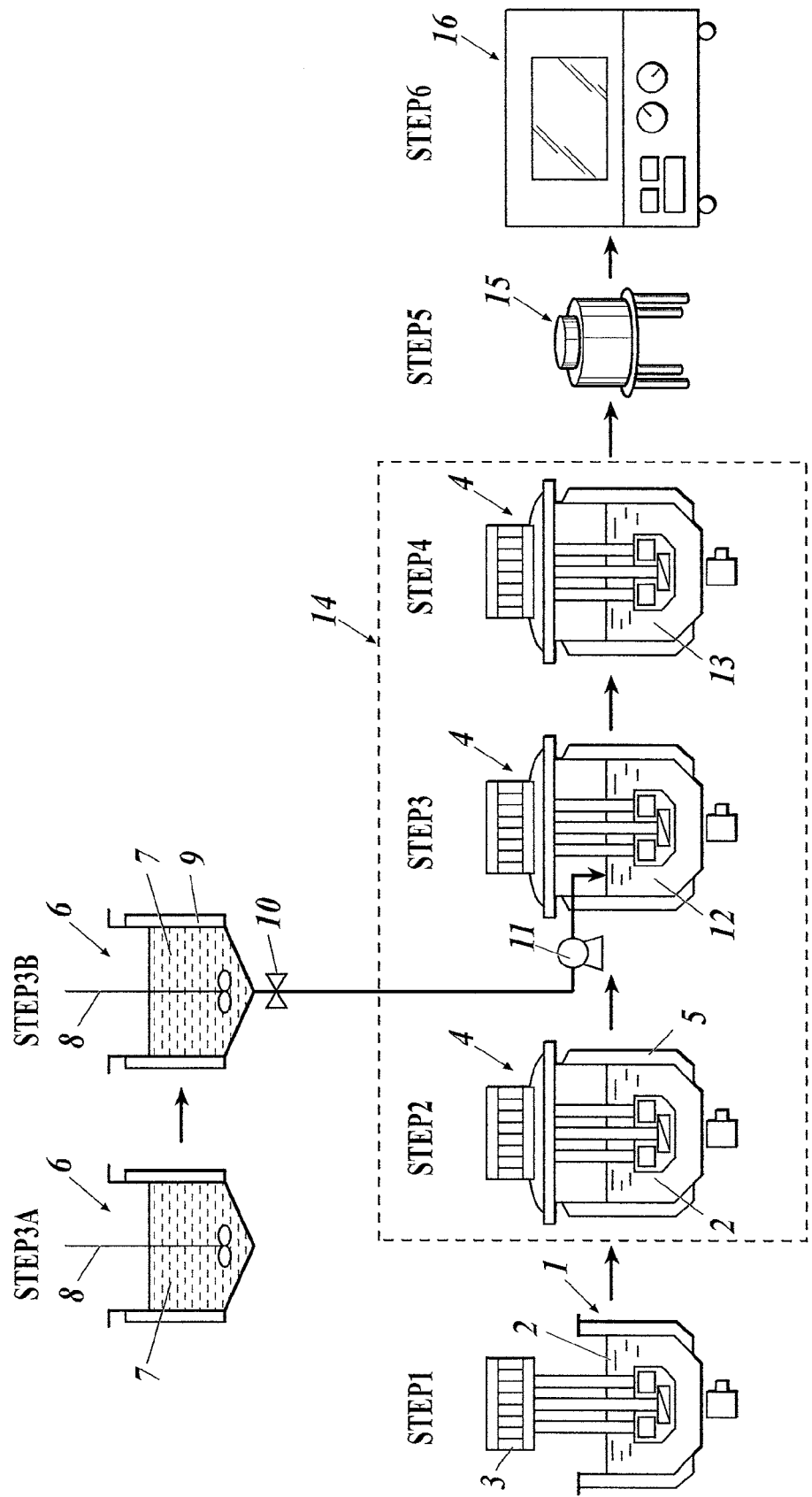
FIG. 5 is a schematic diagram illustrating a flow process chart in accordance with method B as another method for producing an abrasive material containing a particulate abrasive according to another embodiment of the present invention.

The abrasive material of the present invention can be produced by method B mainly involving Steps 1 to 6 of FIG. 5.

Method B for producing the abrasive containing the cerium-oxide-containing particulate abrasive of the present invention will now be described with reference to FIG. 5.

FIG. 5 is a schematic diagram illustrating a flow process chart in accordance with method B, which is a method for producing an abrasive material containing a particulate abrasive according to another embodiment of the present invention.

(1. Step 1: Preparation of Aqueous Rare-Earth Salt Solution)

Step 1 of preparing an aqueous rare-earth salt solution of FIG. 5 involves dissolving a rare-earth salt to prepare an aqueous rare-earth salt solution 2. A rare-earth salt of interest is added to water in a vessel 1 for preparing the aqueous rare-earth salt solution, and then the rare-earth salt is dissolved by mixing with a stirrer 3 to prepare the aqueous rare-earth salt solution 2.

Although FIG. 5 illustrates the case where the open vessel 1 for preparing an aqueous rare-earth salt solution is used for convenience, the present invention is not limited to such cases using an open vessel. Alternatively, a closed pressure vessel 4 used in Steps 2 to 4 described later may be used. Preferably, the closed pressure vessel 4 is used in Step 1, whereby the productivity is increased because only one vessel is used throughout Steps 1 to 4 without changing the vessel.

The aqueous rare-earth salt solution 2 prepared in Step 1 contains at least cerium (Ce).

Preferably, the aqueous rare-earth salt solution 2 used in the method for producing the abrasive material of the present invention is an aqueous rare-earth salt solution 1, 2, 3 or 4 each having the following elemental composition.

<Elemental Composition of Aqueous Rare-Earth Salt Solution 1>

An aqueous rare-earth salt solution 1 which can be prepared in Step 1 of method B of the present invention preferably has an elemental composition satisfying all the following requirements 1c to 3c to produce a particulate abrasive exhibiting a high polishing rate, having a spherical shape, and causing less scratches in polishing processing.

1c: The aqueous rare-earth salt solution of the present invention contains at least one element selected from lanthanum, praseodymium, neodymium, samarium, europium, yttrium, gadolinium, terbium, dysprosium, holmium, erbium, thulium, ytterbium, and lutetium, in addition to cerium.

2c: In the aqueous rare-earth salt solution of the present invention, the sum of the molar proportions of cerium and at least one element selected from lanthanum, praseodymium, neodymium, samarium, and europium to all the rare-earth elements to be contained in the particulate abrasive is 81 mol % or more.

3c: In the aqueous rare-earth salt solution of the present invention, the molar proportion of at least one element selected from yttrium, gadolinium, terbium, dysprosium, holmium, erbium, thulium, ytterbium, and lutetium to all the rare-earth elements to be contained in the particulate abrasive is 19 mol % or less.

<Elemental Composition of Aqueous Rare-Earth Salt Solution 2>

An aqueous rare-earth salt solution 2 which can be prepared in Step 1 of method B of the present invention preferably has an elemental composition satisfying all the following requirements 1d to 3d to produce a particulate abrasive containing cerium in a high molar proportion, having a spherical shape, and exhibiting a high polishing rate.

1d: The aqueous rare-earth salt solution of the present invention contains at least one element selected from yttrium, gadolinium, terbium, dysprosium, holmium, erbium, thulium, ytterbium, and lutetium, in addition to cerium.

2d: In the aqueous rare-earth salt solution of the present invention, the molar proportion of cerium to all the rare-earth elements to be contained in the particulate abrasive is 81 mol % or more.

3d: In the aqueous rare-earth salt solution of the present invention, the molar proportion of at least one element selected from yttrium, gadolinium, terbium, dysprosium, holmium, erbium, thulium, ytterbium, and lutetium to all the rare-earth elements to be contained in the particulate abrasive is 19 mol % or less.

<Elemental Composition of Aqueous Rare-Earth Salt Solution 3>

An aqueous rare-earth salt solution 3 which can be prepared in Step 1 of method B of the present invention preferably has an elemental composition satisfying all the following requirements 1e to 3e to produce a particulate abrasive containing cerium in a very high molar proportion, having a spherical shape, and exhibiting a high polishing rate.

1e: The aqueous rare-earth salt solution of the present invention contains at least one element selected from yttrium, gadolinium, terbium, dysprosium, holmium, erbium, thulium, ytterbium, and lutetium, in addition to cerium.

2e: In the aqueous rare-earth salt solution of the present invention, the molar proportion of cerium to all the elements to be contained in the particulate abrasive is 90 mol % or more.

3e: In the aqueous rare-earth salt solution of the present invention, the molar proportion of at least one element selected from yttrium, gadolinium, terbium, dysprosium, holmium, erbium, thulium, ytterbium, and lutetium to all the rare-earth elements to be contained in the particulate abrasive is 10 mol % or less.

<Elemental Composition of Aqueous Rare-Earth Salt Solution 4>

An aqueous rare-earth salt solution 4 which can be prepared in Step 1 of method B of the present invention preferably has a molar ratio of cerium ranging from 95 to 100 mol % to produce a particulate abrasive through reduced steps, because such a particulate abrasive contains cerium in a high molar proportion and contains substantially no other rare-earth elements.

The ion concentration of the aqueous rare-earth salt solution of the present invention having a molar ratio of cerium to all the rare-earth elements to be contained in the particulate abrasive of the present invention ranging from 95 to 100 mol %, or the ion concentration of the aqueous rare-earth salt solution of the present invention containing at least one element selected from lanthanum, praseodymium, neodymium, samarium, europium, yttrium, gadolinium, terbium, dysprosium, holmium, erbium, thulium, ytterbium, and lutetium, in addition to cerium which is necessarily contained, ranges preferably from 0.001 to 0.1 mol/L.

The ion concentration in a precipitant solution described later, e.g., the ion concentration in an urea solution, ranges preferably from 5 to 50 times the ion concentration of the aqueous rare-earth salt solution.

The monodispersed particulate abrasive having a spherical shape can be produced within the above range of the ion concentration of the aqueous rare-earth salt solution containing substantially no other element than cerium, the ion concentration of the aqueous rare-earth salt solution containing at least one element selected from lanthanum, praseodymium, neodymium, samarium, europium, yttrium, gadolinium, terbium, dysprosium, holmium, erbium, thulium, ytterbium, and lutetium in addition to cerium which is necessarily contained, and the ion concentration of the aqueous precipitant solution (e.g., an aqueous urea solution).

Salts of the above elements used for preparing the aqueous rare-earth salt solution of the present invention can be, for example, nitrates, hydrochlorides, and/or sulfates. Preferred examples of the salts include cerium nitrate, yttrium nitrate, gadolinium nitrate, terbium nitrate, dysprosium nitrate, holmium nitrate, erbium nitrate, thulium nitrate, ytterbium nitrate, and lutetium nitrate. These nitrates can produce an abrasive material containing less impurities.

Note that details of the particulate abrasive will be described later.

(2. Step 2: Heating of Aqueous Rare-Earth Salt Solution)

Subsequent to Step 1 of method B of the present invention, the aqueous rare-earth salt solution 2 prepared in Step 1 is placed into the pressure vessel 4, for example, a closed heating vessel, a closed pressure vessel, a closed heating and pressure vessel, or an autoclave, and then heated to a temperature suitable for preparing a particulate abrasive, as Step 2 of FIG. 5.

Specifically, the aqueous rare-earth salt solution 2 prepared in Step 1 is placed into the pressure vessel 4, and then the pressure vessel 4 is closed or sealed. In the next stage, the aqueous rare-earth salt solution 2 is heated to 100° C. or higher with, for example, a heater of a heating unit 5.

(3. Step 3A: Preparation of Precipitant Solution)

As a separate process, a precipitant solution is prepared in Step 3A.

In Step 3A of method B of the present invention of FIG. 5, a precipitant solution 7 is prepared by adding a precipitant, e.g., urea, to an aqueous medium being stirred with a stirrer 8 in a vessel 6 (open system) for preparing the precipitant solution and dissolving the precipitant. In this step, the precipitant solution under preparation may be heated to 65° C. or lower to prompt the dissolving.

When urea is used as the precipitant and the temperature of the precipitant solution is higher than 65° C., for example, higher than 77° C., urea is decomposed into carbon dioxide gas and ammonia during this step of preparing the precipitant solution, which leads to lower efficacy of the precipitant. In the present invention, the temperature of the precipitant solution is therefore kept at 65° C. or lower in the step of preparing the precipitant solution (Step 3A).

The precipitant is preferably urea or an urea-based compound to stably supply carbon dioxide and ammonia by the hydrolysis.

The precipitant solution can be an aqueous solution of an urea-based compound other than urea, and examples of such an urea-based compound include salts of urea (e.g., urea nitrate and urea hydrochloride), N,N-dimethyl-N'-acetylurea, N,N'-dibenzoylurea, benzenesulfonyl urea, p-toluenesulfonyl urea, trimethylurea, tetraethylurea, tetramethylurea, triphenylurea, tetraphenylurea, N-benzoylurea, methyl isourea, ethyl isourea, and ammonium hydrogen carbonate. In Examples described later, an aqueous urea solution was used to generate a basic rare-earth carbonate, but this is merely an example and the present invention should not be limited to the aqueous urea solution.

(4. Step 3B: Heating of Precipitant Solution)

Subsequent to Step 3A of method B of the present invention, the precipitant solution 7 prepared in Step 3A is heated to 65° C. or lower with a heating unit 9, e.g., a heating jacket in which hot water circulates, as Step 3B of FIG. 5. The temperature of the precipitant solution ranges preferably from 50 to 65° C., and more preferably from 50 to 60° C. A temperature of the precipitant solution of 50° C. or higher can control a decrease in temperature of the reaction mixture upon feeding the precipitant solution to the aqueous rare-earth salt solution in Step 3, and thus can restore the temperature of the reaction mixture at a predetermined temperature after mixing these solutions. A temperature of the precipitant solution of 65° C. or lower can control decomposition of the precipitant, e.g., urea, before mixing the precipitant with the aqueous rare-earth salt solution, and thus can restore the full efficacy of the precipitant in the reaction mixture.

(5. Step 3: Mixing of Aqueous Rare-Earth Salt Solution with Precipitant Solution)

The precipitant solution 7 prepared and kept at 65° C. or lower in Step 3B is fed, with pressure by a pressurizing liquid feeding pump 11, to the aqueous rare-earth salt solution 2 heated to 100° C. or higher in the pressure vessel 4 used in Step 2 while the aqueous rare-earth salt solution 2 is stirred.

The aqueous rare-earth salt solution 2 heated to 100° C. or higher and the precipitant solution 7 are mixed together in the pressure vessel 4 to prepare a reaction mixture 12. In this mixing, the precipitant is heated to 100° C. or higher. In the case of using urea as the precipitant, decomposition of urea starts at this stage to generate carbon dioxide and ammonia, and then a basic rare-earth carbonate is generated as a particulate abrasive precursor.

A high rate of the feeding of the aqueous precipitant solution is preferred. Specifically, the rate of the feeding is preferably 0.5 L/min or more, and more preferably 1.0 L/min or more. A high rate of the feeding of the aqueous precipitant solution forms the nuclear particles generated by the fed aqueous precipitant solution into a spherical shape, avoiding anisotropic growth the nuclear particles.

(6. Step 4: Generation of Particulate Abrasive Precursor)

In Step 4, the reaction mixture 12 which is composed of the aqueous rare-earth salt solution 2 and the precipitant solution 7 and prepared in Step 3 is heated with stirring to prepare a particulate abrasive precursor solution 13.

Specifically, the reaction mixture 12 is heated with stirring. In the reaction mixture 12 prepared by mixing the precipitant solution 7 with the aqueous rare-earth salt solution 2, nuclear particles of the particulate abrasive precursor are generated in the form of dispersion. Heating of reaction mixture 12 containing dispersion of the nuclear particles of the particulate abrasive with stirring grows the nuclear particles. In this way the particulate abrasive precursor solution 13 containing the particulate abrasive precursor is prepared.

The particulate abrasive precursor is generated in the form of a basic rare-earth carbonate after the reaction of the aqueous rare-earth salt solution with the aqueous urea solution.

In the present invention, the reaction mixture is heated to 100° C. or higher in the pressure vessel 4 in Steps 3 and 4. The heating temperature of the reaction mixture ranges preferably from 100 to 150° C., and more preferably from 100 to 130° C. A temperature of the reaction mixture of 100° C. or higher results in stable decomposition of the precipitant, whereby anisotropic growth of the nuclear particles is controlled during the generation of the particulate abrasive precursor, and a highly monodispersed particulate abrasive having a spherical shape can be prepared. A temperature of the reaction mixture of 150° C. or lower prevents the particles from aggregating caused by excessive Brownian motion and achieves high monodispersity. In contrast, a temperature of the reaction mixture of higher than 150° C. generates vapor and increases the internal pressure to higher than 0.5 MPa, which is a high load to the pressure vessel.

Although the internal pressure of a vessel(s) used for the above reaction(s) does not necessarily need any particular control, the internal pressure is preferably controlled within the range from about 0.1 to 0.5 MPa, since vapor generated by the heating and/or ammonia gas and carbon dioxide gas generated by the decomposition of the precipitant pressurize the vessel(s). In the method for producing the abrasive material of the present invention, Steps 2 to 4 are performed in a closed vessel under a pressure condition 14.

Although the time for growing and ripening the particles of the particulate abrasive precursor in Step 4 can be determined depending on various conditions without limitation, this time ranges preferably from about 1 to 10 hours, and more preferably from 1 to 3 hours. The heating temperature and the stirring time (also referred to as the reaction time) are controlled within the ranges preferably from 100 to 150° C. and from 1 to 10 hours, respectively, depending on a target particle size.

In the heating with stirring in Steps 2 to 4, a mixer having any structure can be used without limitation within the scope achieving a sufficient stirring efficiency. To achieve a high stirring efficiency, a rotor-stator mixer is preferred.

(7. Step 5: Solid-Liquid Separation)

In Step 5 (solid-liquid separation), the precipitate (i.e., the particulate abrasive precursor, or a basic rare-earth carbonate) generated by the heating with stirring is separated from the reaction mixture through a solid-liquid separation procedure with a solid-liquid separation device 15. Any traditional procedure can be used in this solid-liquid separation. For example, the particulate abrasive precursor is separated from the reaction mixture by filtration with, for example, a filter for solid-liquid separation.

(8. Step 6: Calcination)

In Step 6 (calcination), the particulate abrasive precursor prepared in Step 5 (solid-liquid separation) is calcined at 400° C. or higher in an oxidizing atmosphere. The calcined particulate abrasive precursor is an oxide, i.e., a cerium-oxide-containing particulate abrasive.

The particulate abrasive precursor may be cleaned with, for example, water or alcohol and dried before the calcination, as needed.

After the calcination, the particulate abrasive is cooled to stabilize the particulate abrasive, and then a bulk of the cooled particulate abrasive is prepared as an abrasive material.

This method for producing the abrasive material of the present invention can prepare an abrasive material that contains a particulate abrasive having a spherical shape and a small particle size distribution, and does not substantially contain anisotropically grown particles.

The content of the particulate abrasive in the abrasive material of the present invention preferably 50% by weight or more, more preferably 70% by weight or more, and most preferably 90% by weight or more to achieve a small surface roughness of a polished object.

(Elemental Composition of Particulate Abrasive Produced by Method B)

<Elemental Composition of Particulate Abrasive 1>

The particulate abrasive of the present invention preferably has an elemental composition satisfying the requirements 1c to 3c described above. That is, the sum of the molar proportions of cerium (Ce) and at least one element selected from lanthanum (La), praseodymium (Pr), neodymium (Nd), samarium (Sm), and europium (Eu) to all the rare-earth elements in the particulate abrasive is preferably 81 mol % or more, and the molar proportion of the at least one element selected from yttrium (Y), gadolinium (Gd), terbium (Tb), dysprosium (Dy), holmium (Ho), erbium (Er), thulium (Tm), ytterbium (Yb), and lutetium (Lu) to all the rare-earth elements in the particulate abrasive is preferably 19 mol % or less. By virtue of this elemental composition, a particulate abrasive can have a spherical shape.

The particulate abrasive of the present invention necessarily contains cerium, and additionally, at least one element selected from lanthanum, praseodymium, neodymium, samarium, and europium. The particulate abrasive of the present invention can include two or more of these elements depending on target characteristics of the abrasive material.

An abrasive material containing at least one element selected from yttrium, gadolinium, terbium, dysprosium, holmium, erbium, thulium, ytterbium, and lutetium in a small molar proportion and having high polishing ability can be prepared with the particulate abrasive which is produced to have a sum of the molar proportions of cerium and at least one element selected from lanthanum, praseodymium, neodymium, samarium, and europium to all the rare-earth elements of 81 mol % or more and a molar proportion of the at least one element selected from yttrium, gadolinium, terbium, dysprosium, holmium, erbium, thulium, ytterbium, and lutetium to all the rare-earth elements of 19 mol % or less, and to have a spherical shape.

<Elemental Composition of Particulate Abrasive 2>

Alternatively, the particulate abrasive of the present invention preferably has an elemental composition satisfying the requirements 1d to 3d described above. That is, the molar proportion of cerium to all the rare-earth elements in the particulate abrasive is preferably 81 mol % or more, the molar proportion of at least one element selected from yttrium, gadolinium, terbium, dysprosium, holmium, erbium, thulium, ytterbium, and lutetium to all the rare-earth elements in the particulate abrasive is preferably 19 mol % or less, and the particulate abrasive of the present invention preferably has a spherical shape.

A higher molar proportion of cerium in the particulate abrasive leads to a higher polishing rate.

<Elemental Composition of Particulate Abrasive 3>

Alternatively, the particulate abrasive of the present invention preferably has an elemental composition satisfying the requirements 1e to 3e described above. That is, the molar proportion of cerium to all the elements in the particulate abrasive is preferably 90 mol % or more, the molar proportion of at least one element selected from yttrium, gadolinium, terbium, dysprosium, holmium, erbium, thulium, ytterbium, and lutetium to all the rare-earth elements in the particulate abrasive is preferably 10 mol % or less, and the particulate abrasive preferably has a spherical shape.

This elemental composition achieves a small molar proportion of at least one element selected from yttrium, gadolinium, terbium, dysprosium, holmium, erbium, thulium, ytterbium, and lutetium, which is contained in the particulate abrasive of the present invention in addition to cerium, and also achieves a spherical shape and reduces the production cost.

<Elemental Composition of Particulate Abrasive 4>

Alternatively, the molar proportion of cerium to all the rare-earth elements in the particulate abrasive of the present invention ranges preferably from 95 to 100 mol %, and the particulate abrasive of the present invention preferably has a spherical shape.

An abrasive material containing the spherical particulate abrasive in which the molar proportion of cerium to all the rare-earth elements ranges from 95 to 100 mol % exhibits a high polishing rate by virtue of this high molar proportion.

The dispersity of the particle size of the monodispersed particulate abrasive of the present invention is preferably 20.0% or less.

An abrasive material containing the highly-monodispersed particulate abrasive causes less scratches and thus is suitable for fine polishing.

<<Method of Polishing Processing>>

A method of polishing processing will now be described with reference to polishing processing on a discoidal glass substrate as an example.

1. Preparation of Abrasive Material Slurry

An abrasive material slurry is prepared by adding a powder abrasive material containing the particulate abrasive to a dispersion medium, such as water. A dispersant is added to the abrasive material slurry to inhibit aggregation and the abrasive material slurry is continuously stirred, whereby the particulate abrasive is kept dispersed in the slurry. The abrasive material slurry is fed to a polisher with a feeding pump in a circulating manner.

2. Polishing Processing

The discoidal glass substrate is brought into contact with a surface plate provided with a polishing pad (or a polishing cloth) thereon. The abrasive material slurry is then fed to the contact surfaces, and the pad and the glass substrate are moved relative to each other to polish the discoidal glass substrate. Details of the method of polishing processing will be described later in Examples with reference to FIG. 6.

EXAMPLES

Methods for producing the abrasive material will now be described with reference to inventive and comparative examples, but the present invention should not be limited to these examples. In Examples, the terms "parts" and "%" refer to "parts by weight" and "% by weight", respectively, unless described otherwise.

Example 1

<<Preparation of Abrasive Material>>
Abrasive materials 1 to 14 were prepared in accordance with method A.
[Preparation of Abrasive Material 1]
Abrasive material 1 was prepared through the following steps.
(Step A)
In this step, 0.5 L of a 5.0 mol/L aqueous urea solution was placed into a closed vessel and heated from 25° C. to 100° C., and then kept at 100° C. for six hours. Subsequently, the aqueous urea solution 1 was cooled to 25° C. (i.e., Step A of FIG. 4).
(Step B)
Pure water, 162 ml of a 1.0 mol/L aqueous cerium nitrate solution (81.0 mol %), and 38 ml of a 1.0 mol/L aqueous yttrium nitrate solution (19.0 mol %) were mixed with each other to prepare 9.5 L of an aqueous rare-earth salt solution 1. The prepared aqueous rare-earth salt solution 1 was then heated to 90° C. (i.e., Step B of FIG. 4).
(Step C)
The aqueous urea solution 1 prepared in Step A and kept at 25° C. was fed to the aqueous rare-earth salt solution 1 heated to 90° C. at a rate of 1 L/min taking 30 seconds to prepare a mixture. In this step, nuclear particles of a particulate abrasive were generated (i.e., Step C of FIG. 4).
(Step D)
The mixture containing the nuclear particles was then heated at 90° C. for 2 hours with stirring to grow the nuclear particles to generate particles of basic rare-earth carbonates as a particulate abrasive precursor (i.e., Step D of FIG. 4).
(Step E)
The particulate abrasive precursor as a precipitate in the mixture heated with stirring in Step D was separated from the mixture through a membrane filter (i.e., Step E of FIG. 4).
(Step F)
The particulate abrasive precursor separated in Step E was calcined at 750° C. in a calcination device to prepare abrasive material 1 containing particulate abrasive 1 in which the molar proportion of cerium oxide was 81 mol % and the molar proportion of yttrium oxide was 19 mol % (i.e., Step F of FIG. 4).
[Preparation of Abrasive Material 2]
Abrasive material 2 was prepared as in abrasive material 1, except that the heating time was 30 minutes in Step D in the preparation of a particulate abrasive.
[Preparation of Abrasive Material 3]
Abrasive material 3 was prepared as in abrasive material 1, except that the heating time was 50 minutes in Step D in the preparation of a particulate abrasive.

[Preparation of Abrasive Material 4]
Abrasive material 4 was prepared as in abrasive material 1, except that the heating time was 3.5 hours in Step D in the preparation of a particulate abrasive.
[Preparation of Abrasive Material 5]
Abrasive material 5 was prepared as in abrasive material 1, except that the heating time was 6 hours in Step D in the preparation of a particulate abrasive.
[Preparation of Abrasive Material 6]
Abrasive material 6 was prepared as in abrasive material 1, except that the heating time was 9 hours in Step D in the preparation of a particulate abrasive.
[Preparation of Abrasive Material 7]
Abrasive material 7 containing particulate abrasive 7 in which the molar proportion of cerium oxide was 90 mol % and the molar proportion of yttrium oxide was 10 mol % was prepared as in abrasive material 1, except that an aqueous rare-earth salt solution 2 having the following elemental composition was prepared in Step B instead of the aqueous rare-earth salt solution 1.
(Preparation of Aqueous Rare-Earth Salt Solution 2)
Pure water, 180 ml of a 1.0 mol/L aqueous cerium nitrate solution (90 mol %), and 20 ml of a 1.0 mol/L aqueous yttrium nitrate solution (10 mol %) were mixed with each other to prepare 9.5 L of the aqueous rare-earth salt solution 2.
[Preparation of Abrasive Material 8]
Abrasive material 8 containing particulate abrasive 8 containing only cerium (100 mol %) was prepared as in abrasive material 1, except that an aqueous rare-earth salt solution 3 having the following elemental composition was prepared in Step B instead of the aqueous rare-earth salt solution 1.
(Preparation of Aqueous Rare-Earth Salt Solution 3)
Pure water and 200 ml of a 1.0 mol/L aqueous cerium nitrate solution (100 mol %) were mixed with each other to prepare 9.5 L of the aqueous rare-earth salt solution 3.
[Preparation of Abrasive Material 9]
Abrasive material 9 was prepared as in abrasive material 4, except that the heating temperature was 84° C. in Step D and the calcination temperature was 700° C. in Step F in the preparation of a particulate abrasive.
[Preparation of Abrasive Material 10]
Abrasive material 10 was prepared as in abrasive material 4, except that the heating temperature was 81° C. in Step D and the calcination temperature was 650° C. in Step F in the preparation of a particulate abrasive.
[Preparation of Abrasive Material 11]
Abrasive material 11 was prepared as in abrasive material 1, except that the heating time was 20 minutes in Step D in the preparation of a particulate abrasive.
[Preparation of Abrasive Material 12]
Abrasive material 12 was prepared as in abrasive material 1, except that the heating time was 12 hours in Step D in the preparation of a particulate abrasive.
[Preparation of Abrasive Material 13]
Abrasive material 13 containing particulate abrasive 13 in which the molar proportion of cerium oxide was 70 mol % and the molar proportion of yttrium oxide was 30 mol % was prepared as in abrasive material 3, except that an aqueous rare-earth salt solution 4 having the following elemental composition was prepared in Step B instead of the aqueous rare-earth salt solution 1.
(Preparation of Aqueous Rare-Earth Salt Solution 4)
Pure water, 140 ml of a 1.0 mol/L aqueous cerium nitrate solution (70 mol %), and 60 ml of a 1.0 mol/L aqueous yttrium nitrate solution (30 mol %) were mixed with each other to prepare 9.5 L of the aqueous rare-earth salt solution 4.

[Preparation of Abrasive Material 14]

Abrasive material 14 containing particulate abrasive 14 in which the molar proportion of cerium oxide was 70 mol % and the molar proportion of yttrium oxide was 30 mol % was prepared as in abrasive material 12, except that the aqueous rare-earth salt solution 4 was prepared in Step B instead of the aqueous rare-earth salt solution 1.

<<Evaluation of Abrasive Material>>

[Measurement of Parameters of Particulate Abrasive in Abrasive Material]

(Measurement of CV (%), Coefficient of Variation in Particle Size)

A scanning electron micrograph (SEM image) of the particulate abrasive of each prepared abrasive material was taken, and 100 particles in the micrograph were selected at random. The diameters of these particles were then measured, and an average particle diameter and the standard deviation of the particle size distribution were calculated from the measured diameters. The coefficient of variation in particle size (i.e., CV), which is an indicator of monodispersity, was then calculated by the following expression. The particle diameter of each particle was a projected area diameter calculated based on the area of each particle in the SEM image.

Coefficient of variation in particle size (%)=(standard deviation of particle size distribution/average particle diameter)×100

(Measurement of Average Aspect Ratio (Average AR))

A scanning electron micrograph (SEM image) of the particulate abrasive of each prepared abrasive material was taken, and 100 particles in the micrograph were selected at random. The longest diameter a and the shortest diameter b were measured for each selected particle. The average of the ratio a/b values of the selected particles was defined as an average aspect ratio. The longest diameter a and the shortest diameter b were the length of the longer side and the length of the shorter side, respectively, of the circumscribed rectangle of each particle.

(Measurement of Particle Size $D_{50}$)

An image (i.e., a SEM image) of each particulate abrasive was taken with a scanning electron microscope as described above, and 100 particles in the image are selected at random. A diameter of a circle having the same area as the selected particle was defined as the diameter of each selected particle.

In the next stage, the calculated diameters of the particles were plotted along the abscissa, and the cumulative numbers of the particles were plotted along the ordinate (an integral curve) to draw a cumulative particle size distribution of the particulate abrasive.

The particle diameter at a cumulative number of 50% in the cumulative curve was defined as $D_{50}$, as shown in FIG. 3.

(Evaluation of Polishing Rate and Sustainability of Polishing Rate)

<Preparation of Abrasive Material Slurry>

Powder of each abrasive material prepared in the above procedures was dispersed in water as a dispersion medium to give a concentration of the abrasive particle of 100 g/L. The resulting dispersion was then filtrated to remove coarse particles through a filter having a pore size of 5 μm. In this way each abrasive material slurry was prepared.

<Measurement of Polishing Rate 1: Polishing Rate at Initial Stage of Polishing>

Figure 6:
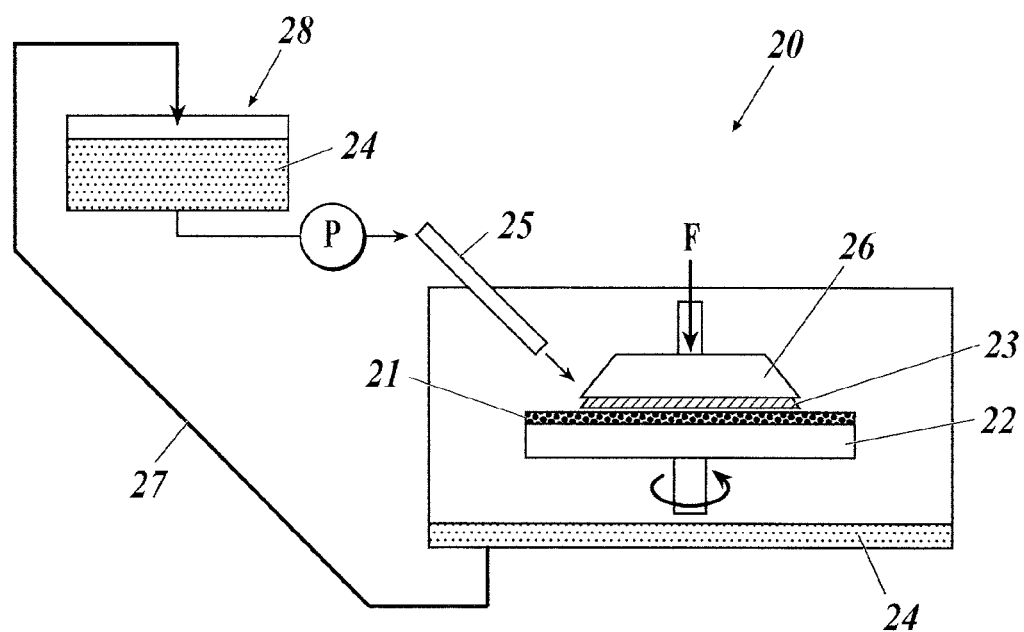
FIG. 6 is a schematic configuration of a polishing device used in measurement of a polishing rate.

To measure the polishing rate, a polishing device 20 shown in FIG. 6 was used.

The polishing device 20 included a polishing plate 22 provided with a suede polishing cloth as a polishing cloth 21 thereon. The polishing plate 22 was rotatable. During polishing processing, an object (a crystallized glass substrate, ⌀48) 23 held by an object holder 26 was pressed at a pressure force F of 9.8 kPa (100 g/cm$^2$) against the polishing plate 22 rotating at 50 min$^{-1}$ (rpm). An abrasive material slurry 24 pooled in a slurry tank 28 and kept at 25° C. was then fed from a slurry nozzle 25 to the polishing cloth 21 using a pump P. The abrasive material slurry 24 used in the polishing processing was pooled at the bottom of the polishing device 20, and recovered therefrom through a passage 27 to the slurry tank 28, whereby the abrasive material slurry 24 repeatedly circulated between the polishing device 20 and the slurry tank 28. The polishing processing was performed for 30 minutes in accordance with the above conditions.

In the next stage, the thicknesses of the object 23 before and after the 30-minute polishing processing were measured with Digimicro (MF501) manufactured by Nikon Corporation. The polished depth (μm) per minute was calculated with the difference between these thicknesses and was defined as the polishing rate 1 (μm/min).

<Measurement of Polishing Rate 2: Polishing Rate after Continuous Polishing>

The above 30-minute polishing processing was then repeated 10 times, and the polishing rate (μm/min) at the 10th polishing processing was measured as in the above measurement and was defined as the polishing rate 2 (μm/min).

<Evaluation of Polishing Rate>

The polishing rate 1 and the polishing rate 2 were ranked in accordance with the following criteria.

S: polishing rate is 0.90 μm/min or more

A: polishing rate is 0.70 μm/min or more, and is less than 0.90 μm/min

B: polishing rate is 0.50 μm/min or more, and is less than 0.70 μm/min

C: polishing rate is less than 0.50 μm/min

The polishing rate of the cerium-oxide-containing abrasive material was evaluated based on the rank of the polishing rate 1. The sustainability of the polishing rate was evaluated based on the difference between the ranks of the polishing rate 1 and the polishing rate 2, and a smaller difference indicates a greater sustainability of the polishing rate. The rank B or higher indicates the polishing rate is preferred for practical use.

(Measurement of Surface Roughness Ra of Object)

For the surface roughness Ra of the object (i.e., the ⌀48 crystallized glass substrate), the polished surface of the ⌀48 crystallized glass substrate after the 30-minute polishing processing for the evaluation of the polishing rate 1 was measured with a light wave interferometer (i.e., the dual-channel ZeMapper, Zygo Corporation). The surface roughness Ra is an arithmetic mean roughness measured by the method in accordance with JIS B0601-2001.

Results of the calculations and evaluations are shown in Table 1.

TABLE 1

| ABRASIVE MATERIAL No. | AQUEOUS RARE-EARTH SALT SOLUTION | | STEP D HEATING | | STEP F CALCINATION | PARTICULATE ABRASIVE PARAMETERS |
|---|---|---|---|---|---|---|
| | CERIUM (mol %) | YTTRIUM (mol %) | TEMPERATURE (° C.) | HEATING TIME | TEMPERATURE (° C.) | CV (%) |
| 1 | 81 | 19 | 90 | 2.0 hours | 750 | 7.0 |
| 2 | 81 | 19 | 90 | 30 min. | 750 | 9.0 |
| 3 | 81 | 19 | 90 | 50 min. | 750 | 8.3 |
| 4 | 81 | 19 | 90 | 3.5 hours | 750 | 6.8 |
| 5 | 81 | 19 | 90 | 6.0 hours | 750 | 7.3 |
| 6 | 81 | 19 | 90 | 9.0 hours | 750 | 7.7 |
| 7 | 90 | 10 | 90 | 2.0 hours | 750 | 6.5 |
| 8 | 100 | — | 90 | 2.0 hours | 750 | 6.1 |
| 9 | 81 | 19 | 84 | 3.5 hours | 700 | 10.8 |
| 10 | 81 | 19 | 81 | 3.5 hours | 650 | 12.2 |
| 11 | 81 | 19 | 90 | 20 min. | 750 | 8.5 |
| 12 | 81 | 19 | 90 | 12 hours | 750 | 11.3 |
| 13 | 70 | 30 | 90 | 50 min. | 750 | 7.5 |
| 14 | 70 | 30 | 90 | 12 hours | 750 | 10.3 |

| ABRASIVE MATERIAL No. | PARTICULATE ABRASIVE PARAMETERS | | RESULTS OF EVALUATION | | | NOTE |
|---|---|---|---|---|---|---|
| | AVERAGE ASPECT RATIO | PARTICLE SIZE $D_{50}$ (nm) | POLISHING CHARACTERISTICS POLISHING RATE 1 | POLISHING RATE 2 | SURFACE ROUGHNESS OF POLISHED OBJECT (Å) | |
| 1 | 1.05 | 302 | A | B | 5.7 | INVENTIVE |
| 2 | 1.03 | 52 | B | B | 3.2 | INVENTIVE |
| 3 | 1.05 | 108 | B | B | 4.5 | INVENTIVE |
| 4 | 1.05 | 513 | A | B | 6.1 | INVENTIVE |
| 5 | 1.10 | 1063 | B | B | 7.7 | INVENTIVE |
| 6 | 1.15 | 1480 | B | B | 8.3 | INVENTIVE |
| 7 | 1.04 | 296 | A | B | 5.3 | INVENTIVE |
| 8 | 1.03 | 283 | A | A | 4.8 | INVENTIVE |
| 9 | 1.20 | 480 | C | C | 9.6 | COMPARATIVE |
| 10 | 1.30 | 495 | C | C | 10.3 | COMPARATIVE |
| 11 | 1.11 | 38 | B | C | 5.9 | COMPARATIVE |
| 12 | 1.12 | 1980 | C | C | 11.3 | COMPARATIVE |
| 13 | 1.10 | 98 | B | C | 7.1 | COMPARATIVE |
| 14 | 1.11 | 2010 | C | C | 12.6 | COMPARATIVE |

The results in Table 1 demonstrate that the abrasive materials of the present invention, each of which has an average aspect ratio of 1.00 to 1.15, a particle size $D_{50}$ (nm) of 50 to 1500 nm, and containing cerium in a molar proportion of 81 mol % or more, exhibit a higher polishing rate, and achieve greater sustainability of the polishing rate and a highly smooth polished surface, compared to the comparative examples.

The particulate abrasives of the abrasive materials 9 to 14, which do not satisfy at least one of the average aspect ratio, the particle size $D_{50}$ (nm), and the molar proportion of cerium of the present invention, have a large particle size distribution, exhibit an insufficient polishing rate and lead to a low smoothness of the polished surface. In addition, the particulate abrasives of the abrasive materials having the particle size $D_{50}$ (nm) and/or the average aspect ratio higher than the upper limit of the present invention exhibit a low polishing rate even at the initial stage (i.e., the polishing rate 1) of the polishing processing, since these abrasive materials cannot have a sufficient contact area to the object.

Example 2

<<Preparation of Abrasive Material>>
[Preparation of Abrasive Materials 15 to 20]
Abrasive materials 15 to 20 were prepared as in abrasive material 1 of Example 1, except that the concentrations of the aqueous rare-earth salt solution 1, the heating times and the heating temperatures of the aqueous urea solution 1 were changed to give the ratios $D_{max}/D_{50}$, $D_{10}/D_{50}$, and $D_{90}/D_{50}$ shown in Table 2.

To increase the ratios $D_{max}/D_{50}$ and $D_{90}/D_{50}$, the concentration of the aqueous rare-earth salt solution 1 prepared in Step B was increased. To increase the ratio $D_{10}/D_{50}$, the heating temperature of the aqueous urea solution 1 was decreased in Step A to decrease the concentrations of the compounds generated by the decomposition of urea.

<<Evaluation of Abrasive Material>>
The prepared abrasive materials 15 to 20 and the abrasive material 1 of Example 1 were evaluated for the following aspects.
[Particle Size Distribution Parameter: Measurement of Particle Sizes $D_{10}$, $D_{50}$, $D_{90}$, and $D_{max}$]

As in the measurement of the particle size $D_{50}$ in Example 1, the diameters of the particles for the particulate abrasive of each abrasive material were plotted along the abscissa, and the cumulative numbers of the particles were plotted along the ordinate (an integral curve) to draw a cumulative particle size distribution of each particulate abrasive, as illustrated in FIG. 3. The particle diameters at cumulative numbers of 10%, 50%, 90%, and 100% in the cumulative curve were then defined as $D_{10}$, $D_{50}$, $D_{90}$, and $D_{max}$, as shown in FIG. 3. Subsequently, the ratios $D_{max}/D_{50}$, $D_{10}/D_{50}$, and $D_{90}/D_{50}$ were calculated with these parameters.

[Evaluation of Polishing Rate and Sustainability of Polishing Rate]

The polishing rate 1 and the polishing rate 2 were measured, and the polishing rate and the sustainability of the polishing rate were evaluated as in Example 1.

Results of the calculations and evaluations are shown in Table 2.

TABLE 2

| ABRASIVE MATERIAL No. | PARTICLE SIZE DISTRIBUTION PARAMETERS | | | POLISHING CHARACTERISTICS | |
|---|---|---|---|---|---|
| | $D_{10}/D_{50}$ | $D_{90}/D_{50}$ | $D_{max}/D_{50}$ | POLISHING RATE 1 | POLISHING RATE 2 |
| 1 | 0.51 | 1.70 | 1.81 | A | B |
| 15 | 0.53 | 1.35 | 1.42 | A | A |
| 16 | 0.55 | 1.52 | 1.62 | A | A |
| 17 | 0.73 | 1.35 | 1.43 | S | A |
| 18 | 0.91 | 1.33 | 1.41 | S | A |
| 19 | 0.93 | 1.16 | 1.21 | S | S |
| 20 | 0.92 | 1.29 | 1.35 | S | S |

The results in Table 2 demonstrate the ratios $D_{max}/D_{50}$, $D_{10}/D_{50}$, and $D_{90}/D_{50}$ closer to 1.00, that is, a smaller particle size distribution and higher monodispersity, lead to a much higher polishing rate and higher sustainability of the polishing rate.

Example 3

<<Preparation of Abrasive Material>>

[Preparation of Abrasive Material 101]

Abrasive material 101 was prepared in accordance with the following steps. The numbers in parentheses described with the following components correspond to the numbers in FIG. 5.

(1) In the flow process chart of FIG. 5, 0.5 L of a 5.0 mol/L aqueous urea solution 101 was prepared as the aqueous precipitant solution (7), and then fed to the vessel (6) for preparing the aqueous precipitant solution and heated to 60° C. (see Steps 3A and 3B of FIG. 5).

(2) As in Step 2 of FIG. 5, pure water was added to 200 ml of a 1.0 mol/L aqueous cerium nitrate solution to prepare 9.5 L of an aqueous rare-earth salt solution 101 (2), and then the aqueous rare-earth salt solution 101 was placed into an autoclave as the pressure vessel (4) and heated to 115° C. (see Step 2 of FIG. 5).

(3) As in Step 3 of FIG. 5, a 5.0 mol/L aqueous urea solution 101, i.e., the aqueous precipitant solution (7) kept at 60° C. as in Step 3B of FIG. 5 was fed to the aqueous rare-earth salt solution 101 (2) (100 mol % cerium) heated to 115° C. and being stirred using a pressurizing liquid feeding pump (11) taking 30 seconds to prepare a reaction mixture (see Step 3 of FIG. 5).

The observed temperature of the reaction mixture prepared by mixing the aqueous rare-earth salt solution 101 (2) with the aqueous urea solution 101 was 111.3° C.

(4) As in Step 4 of FIG. 5, the reaction mixture prepared in Step 3 was kept at 110° C. and stirred for 1 hour to prepare a particulate abrasive precursor solution 101 (13) (see Step 4 of FIG. 5).

(5) As in Step 5 of FIG. 5, the precipitant, i.e., the particulate abrasive precursor, in the heated and stirred particulate abrasive precursor solution 101 (13) was separated through a membrane filter (see Step 5 of FIG. 5).

(6) The separated particulate abrasive precursor was calcined at 600° C. in a roller hearth kiln as the calcination device (16) to prepare abrasive material 101 containing a particulate abrasive.

[Preparation of Abrasive Material 102]

Abrasive material 102 was prepared as in abrasive material 101, except that an aqueous rare-earth salt solution 102 having the following elemental composition was prepared instead of the aqueous rare-earth salt solution 101.

(Preparation of Aqueous Rare-Earth Salt Solution 102)

Pure water, 180 ml of a 1.0 mol/L aqueous cerium nitrate solution (90 mol %), and 20 ml of a 1.0 mol/L aqueous yttrium nitrate solution (10 mol %) were mixed with each other to prepare 9.5 L of the aqueous rare-earth salt solution 102.

[Preparation of Abrasive Materials 103 to 123]

Abrasive materials 103 to 123 were prepared as in abrasive material 102, except that aqueous rare-earth salt solutions containing the elements and having the molar proportions of the elements as shown in Table 3 were prepared and used. Each reaction temperature shown in Table 3 is the observed value of each aqueous rare-earth salt solution prepared by mixing the aqueous rare-earth salt solution 101 with the aqueous urea solution 101 in Step 3.

[Preparation of Abrasive Material 124]

Abrasive material 124 was prepared as in abrasive material 101, except that the heating temperature of the aqueous rare-earth salt solution 101 in the autoclave in Step 3 was 103° C. The reaction temperature shown in Table 3 is the observed value of the reaction mixture prepared by mixing the aqueous rare-earth salt solution 101 and the aqueous urea solution 101 in Step 3.

[Preparation of Abrasive Material 125]

Abrasive material 125 was prepared as in abrasive material 101, except that the heating temperature of the aqueous rare-earth salt solution 101 in the autoclave in Step 3 was 125° C. The reaction temperature shown in Table 3 is the observed value of the reaction mixture prepared by mixing the aqueous rare-earth salt solution 101 and the aqueous urea solution 101 in Step 3.

[Preparation of Abrasive Material 126]

Abrasive material 126 was prepared as in abrasive material 101, except that the heating temperature of the aqueous rare-earth salt solution 101 in the autoclave in Step 3 was 135° C. The reaction temperature shown in Table 3 is the observed value of the reaction mixture prepared by mixing the aqueous rare-earth salt solution 101 and the aqueous urea solution 101 in Step 3.

[Preparation of Abrasive Material 127]

Abrasive material 127 was prepared as in abrasive material 101, except that the heating temperature of the aqueous rare-earth salt solution 101 in the autoclave in Step 3 was 145° C. The reaction temperature shown in Table 3 is the observed value of the reaction mixture prepared by mixing the aqueous rare-earth salt solution 101 and the aqueous urea solution 101 in Step 3.

[Preparation of Abrasive Material 128]

Abrasive material 128 was prepared as in abrasive material 101, except that the heating temperature of the aqueous rare-earth salt solution 101 in the autoclave in Step 3 was 155° C. The reaction temperature shown in Table 3 is the observed value of the reaction mixture prepared by mixing the aqueous rare-earth salt solution 101 and the aqueous urea solution 101 in Step 3.

[Preparation of Abrasive Material 129]

Abrasive material 129 was prepared as in abrasive material 101, except that the heating temperature of the aqueous rare-earth salt solution 101 in the autoclave in Step 3 was 93° C. The reaction temperature shown in Table 3 is the observed value of the reaction mixture prepared by mixing the aqueous rare-earth salt solution 101 and the aqueous urea solution 101 in Step 3.

[Preparation of Abrasive Material 130]

Abrasive material 130 was prepared as in abrasive material 101, except that the heating temperature of the aqueous rare-earth salt solution 101 in the autoclave in Step 3 was 98° C. The reaction temperature shown in Table 3 is the observed value of the reaction mixture prepared by mixing the aqueous rare-earth salt solution 101 and the aqueous urea solution 101 in Step 3.

[Preparation of Abrasive Material 131]

After 0.5 L of a 5.0 mol/L aqueous urea solution was mixed with 200 ml of a 1.0 mol/L aqueous cerium nitrate solution, pure water was added to the resulting mixture to prepare 10.0 L of a reaction mixture. The reaction mixture was kept at 25° C. in an autoclave and then heated to 110° C. taking 30 minutes as in Step 3. Subsequent Steps 4 to 6 were as those in abrasive material 101. In this way abrasive material 131 was prepared.

[Preparation of Abrasive Material 132]

Abrasive material 132 was prepared as in abrasive material 101, except that an open vessel such as the one used in Step 3A was used throughout Steps 2 to 4 instead of an autoclave or pressure vessel.

<<Measurement of Parameters of Particulate Abrasive in Abrasive Material>>

[Shape of Particle]

Scanning electron micrographs (i.e., SEM images) of the particulate abrasives were taken, and the aspect ratios were measured in accordance with the following procedures. The particulate abrasive having an aspect ratio of 1.00 to 1.15 was defined as spherical, and the particulate abrasive having an aspect ratio of 1.16 or more was defined as indeterminate. The scanning electron micrograph (i.e., the SEM image) of abrasive material 32 included both spherical and indeterminate particles.

[Measurement of Aspect Ratio]

A scanning electron micrograph (SEM image) of the particulate abrasive of each prepared abrasive material was taken, and 100 particles in the micrograph were selected at random. The longest diameter a and the shortest diameter b were measured for each selected particle. The average of the ratio a/b values of the selected particles was defined as an average aspect ratio. The longest diameter a and the shortest diameter b were the length of the longer side and the length of the shorter side, respectively, of the circumscribed rectangle of each particle.

[Coefficient of Variation in Particle Size: Measurement of CV]

A scanning electron micrograph (SEM image) of the particulate abrasive of each prepared abrasive material was taken, and 100 particles in the micrograph were selected at random. The diameters of these particles were then measured, and the average particle diameter and the standard deviation of the particle size distribution were calculated from the observed diameters. The coefficient of variation in particle size (i.e., CV), which is an indicator of monodispersity, was then calculated by the following expression. The particle diameter of each particle was a projected area diameter calculated based on the area of each particle in the SEM image.

Coefficient of variation in particle size (%)=(standard deviation of particle size distribution/average particle diameter)×100

[Measurement of Polishing Rate]

Powder of each abrasive material containing the particulate abrasive prepared in the above procedures was dispersed in water as a dispersion medium to give a concentration of the abrasive particle of 100 g/L. The resulting dispersion was then filtrated to remove coarse particles through a filter having a pore size of 5 µm. In this way each abrasive material slurry was prepared.

The polishing rates were measured from a polishing processing involving feeding each abrasive material slurry to a surface of an object in a polishing device during polishing the surface with a polishing cloth. In the polishing processing, the abrasive material slurry was fed at a flow rate of 5 L/min in a circulating manner. A 65 mmΦ glass substrate was used as the object, and a polyurethane cloth was used as the polishing cloth. The pressure force against the surface in the polishing processing was 9.8 kPa (100 g/cm$^2$), the rotation rate of the polishing device was 100 min$^{-1}$ (rpm), and the polishing processing was performed for 30 minutes. The thicknesses of the object before and after the polishing processing were measured with Digimicro (MF501) manufactured by Nikon Corporation The polished depth (µm) per minute was calculated with the difference between these thicknesses and was defined as the polishing rate (µm/min).

[Measurement of Surface Roughness]

The polished surface of the glass substrate after the 30-minute polishing processing was measured with a light wave interferometer (i.e., the dual-channel ZeMapper, Zygo Corporation) and defined as the surface roughness Ra. The surface roughness Ra is an arithmetic mean roughness measured by the method in accordance with JIS B0601-2001.

Results of the calculations and evaluations are shown in Table 3.

TABLE 3

| ABRASIVE MATERIAL No. | STEP 3 REACTION TEMPERATURE (° C.) | RARE-EARTH ELEMENT COMPOSITION (RARE-EARTH SALT) | | | | | REACTION VESSEL |
|---|---|---|---|---|---|---|---|
| | | CERIUM (mol %) | ADDITIONAL ELEMENT 1 | | ADDITIONAL ELEMENT 2 | | |
| | | | ELEMENT | (mol %) | ELEMENT | (mol %) | |
| 101 | 111.3 | 100 | — | — | — | — | CLOSED SYSTEM |
| 102 | 112.1 | 90 | Y | 10 | — | — | CLOSED SYSTEM |
| 103 | 111.3 | 90 | Gb | 10 | — | — | CLOSED SYSTEM |
| 104 | 111.8 | 90 | Tb | 10 | — | — | CLOSED SYSTEM |
| 105 | 111.6 | 90 | Dy | 10 | — | — | CLOSED SYSTEM |
| 106 | 111.0 | 90 | Ho | 10 | — | — | CLOSED SYSTEM |
| 107 | 112.0 | 90 | Er | 10 | — | — | CLOSED SYSTEM |
| 108 | 112.3 | 90 | Tm | 10 | — | — | CLOSED SYSTEM |
| 109 | 112.0 | 90 | Yb | 10 | — | — | CLOSED SYSTEM |
| 110 | 110.9 | 90 | Lu | 10 | — | — | CLOSED SYSTEM |
| 111 | 111.9 | 90 | Y(*2) | 10 | — | — | CLOSED SYSTEM |
| 112 | 111.4 | 90 | Y | 5 | Gd | 5 | CLOSED SYSTEM |
| 113 | 111.5 | 81 | Y | 19 | — | — | CLOSED SYSTEM |
| 114 | 112.1 | 81 | Gd | 19 | — | — | CLOSED SYSTEM |
| 115 | 110.8 | 81 | Y | 10 | Gd | 9 | CLOSED SYSTEM |
| 116 | 111.2 | 70 | La | 30 | — | — | CLOSED SYSTEM |
| 117 | 110.9 | 70 | Pr | 30 | — | — | CLOSED SYSTEM |
| 118 | 110.5 | 70 | Nd | 30 | — | — | CLOSED SYSTEM |
| 119 | 111.0 | 70 | Sm | 30 | — | — | CLOSED SYSTEM |
| 120 | 111.7 | 70 | Eu | 30 | — | — | CLOSED SYSTEM |
| 121 | 111.1 | 70 | La | 20 | Pr | 10 | CLOSED SYSTEM |
| 122 | 111.5 | 70 | La | 20 | Y | 10 | CLOSED SYSTEM |
| 123 | 112.2 | 70 | La | 11 | Y | 19 | CLOSED SYSTEM |
| 124 | 100.8 | 100 | — | — | — | — | CLOSED SYSTEM |
| 125 | 121.5 | 100 | — | — | — | — | CLOSED SYSTEM |
| 126 | 131.2 | 100 | — | — | — | — | CLOSED SYSTEM |
| 127 | 140.7 | 100 | — | — | — | — | CLOSED SYSTEM |
| 128 | 150.1 | 100 | — | — | — | — | CLOSED SYSTEM |
| 129 | 91.4 | 100 | — | — | — | — | CLOSED SYSTEM |
| 130 | 96.1 | 100 | — | — | — | — | CLOSED SYSTEM |
| 131 | 110.5(*1) | 100 | — | — | — | — | CLOSED SYSTEM |
| 132 | 112.3 | 100 | — | — | — | — | OPEN SYSTEM |

| ABRASIVE MATERIAL No. | OBSERVED PARAMETERS | | | | | NOTE |
|---|---|---|---|---|---|---|
| | PARTICLE SHAPE | ASPECT RATIO | CV (%) | POLISHING RATE (μm/min) | SURFACE ROUGHNESS Ra (Å) | |
| 101 | SPHERICAL | 1.03 | 8.8 | 0.81 | 8.8 | INVENTIVE |
| 102 | SPHERICAL | 1.02 | 8.0 | 0.72 | 4.0 | INVENTIVE |
| 103 | SPHERICAL | 1.02 | 6.5 | 0.71 | 3.3 | INVENTIVE |
| 104 | SPHERICAL | 1.02 | 8.0 | 0.76 | 8.7 | INVENTIVE |
| 105 | SPHERICAL | 1.02 | 8.6 | 0.73 | 3.3 | INVENTIVE |
| 106 | SPHERICAL | 1.04 | 6.2 | 0.76 | 8.5 | INVENTIVE |
| 107 | SPHERICAL | 1.02 | 8.2 | 0.72 | 8.5 | INVENTIVE |
| 108 | SPHERICAL | 1.05 | 6.4 | 0.69 | 9.3 | INVENTIVE |
| 109 | SPHERICAL | 1.03 | 5.6 | 0.73 | 5.3 | INVENTIVE |
| 110 | SPHERICAL | 1.04 | 5.8 | 0.72 | 3.1 | INVENTIVE |
| 111 | SPHERICAL | 1.02 | 7.8 | 0.71 | 8.0 | INVENTIVE |
| 112 | SPHERICAL | 1.05 | 6.1 | 0.72 | 9.7 | INVENTIVE |
| 113 | SPHERICAL | 1.03 | 6.7 | 0.62 | 4.8 | INVENTIVE |
| 114 | SPHERICAL | 1.03 | 9.4 | 0.64 | 6.1 | INVENTIVE |
| 115 | SPHERICAL | 1.05 | 8.4 | 0.59 | 5.5 | INVENTIVE |
| 116 | SPHERICAL | 1.02 | 6.3 | 0.59 | 6.8 | INVENTIVE |
| 117 | SPHERICAL | 1.04 | 7.4 | 0.52 | 8.6 | INVENTIVE |
| 118 | SPHERICAL | 1.02 | 5.7 | 0.59 | 7.1 | INVENTIVE |
| 119 | SPHERICAL | 1.04 | 7.9 | 0.58 | 8.4 | INVENTIVE |
| 120 | SPHERICAL | 1.04 | 9.5 | 0.57 | 9.2 | INVENTIVE |
| 121 | SPHERICAL | 1.04 | 9.6 | 0.53 | 4.1 | INVENTIVE |
| 122 | SPHERICAL | 1.05 | 5.5 | 0.53 | 7.7 | INVENTIVE |
| 123 | SPHERICAL | 1.04 | 8.9 | 0.58 | 3.9 | INVENTIVE |
| 124 | SPHERICAL | 1.05 | 10.1 | 0.78 | 9.7 | INVENTIVE |
| 125 | SPHERICAL | 1.02 | 8.2 | 0.83 | 4.2 | INVENTIVE |
| 126 | SPHERICAL | 1.02 | 9.5 | 0.77 | 6.3 | INVENTIVE |
| 127 | SPHERICAL | 1.05 | 16.7 | 0.83 | 10.8 | INVENTIVE |
| 128 | SPHERICAL | 1.05 | 20.6 | 0.76 | 13.3 | INVENTIVE |
| 129 | INDETERMINATE | 2.62 | 86.9 | 0.84 | 22.3 | COMPARATIVE |
| 130 | INDETERMINATE | 3.05 | 73.6 | 0.82 | 20.5 | COMPARATIVE |
| 131 | INDETERMINATE | 3.21 | 80.3 | 0.77 | 33.5 | COMPARATIVE |

TABLE 3-continued

| | | | | | | | |
|---|---|---|---|---|---|---|---|
| | 132 | SPHERICAL + INDETERMINATE | 1.72 | 32.1 | 0.75 | 18.9 | COMPARATIVE |

(*1)The aqueous urea solution was mixed with the aqueous rare-earth salt solution at room temperature, and then the mixture was heated for 30 minutes to 110.5° C.
(*2)Yttrium chloride was used. (yttrium nitrate was used in all other Y's.)

The results in Table 3 demonstrate that the abrasive materials produced by method B of the present invention have high sphericity and monodispersity, and achieve a sufficient polishing rate, a highly smooth polished surface and high polishing ability, compared to the comparative examples.

INDUSTRIAL APPLICABILITY

The particulate abrasive of the present invention has polishing ability suitable for fine polishing, and achieves a high polishing rate and high monodispersity, and thus is suitably used in a method of polishing processing for fine polishing of optical elements such as optical glasses.

DESCRIPTION OF REFERENCE SIGNS 1 vessel for preparing aqueous rare-earth salt solution (open system)
2 aqueous rare-earth salt solution
3 stirrer
4 pressure vessel
5, 9 heating unit
6 vessel for preparing precipitant solution (open system)
7 precipitant solution
8 stirrer
10 valve
11 pressurizing liquid feeding pump
12 mixture of aqueous rare-earth salt solution and precipitant solution (reaction mixture)
13 particulate abrasive precursor solution
14 pressure condition in closed vessel
15 solid-liquid separation device
16 calcination device
20 polishing device
21 polishing cloth
22 polishing plate
23 object
24 abrasive material slurry
25 slurry nozzle
26 object holder
27 passage
28 slurry tank
F pressure force
Step 1 preparation of aqueous rare-earth salt solution
Step 2 heating of aqueous rare-earth salt solution (pressure vessel)
Step 3 mixing of aqueous rare-earth salt solution with precipitant solution (pressure vessel)
Step 3A preparation of precipitant solution (open system)
Step 3B heating of precipitant solution (open system)
Step 4 generation of particulate abrasive precursor (pressure vessel)
Step 5 solid-liquid separation
Step 6 calcination
Step A preparation of aqueous precipitant solution (closed system)
Step B preparation of aqueous rare-earth salt solution (open system)
Step C feeding of aqueous precipitant solution (generation of nuclear particle)
Step D heating with stirring (growth of particle)
Step E solid-liquid separation
Step F calcination

The invention claimed is:

1. A particulate abrasive produced by a synthetic process using an aqueous rare-earth salt solution and a precipitant, wherein
the particulate abrasive has a spherical shape and an average aspect ratio of 1.00 to 1.15;
the particulate abrasive has a particle size $D_{50}$ (nm) of 50 to 1500 nm determined by a cumulative particle size distribution curve; and
an average molar proportion of cerium to all rare-earth elements in the particulate abrasive, or a sum of molar proportions of cerium and at least one element selected from lanthanum (La), praseodymium (Pr), neodymium (Nd), samarium (Sm), and europium (Eu) to all rare-earth elements in the particulate abrasive, is 81 mol % or more.

2. The particulate abrasive according to claim 1, wherein the particle size $D_{50}$ (nm) determined by the cumulative particle size distribution curve ranges from 300 to 500 nm.

3. The particulate abrasive according to claim 1, wherein a maximum particle size $D_{max}$ (nm) determined by the cumulative particle size distribution curve ranges from 1.20 to 1.60 times the particle size $D_{50}$ (nm).

4. The particulate abrasive according to claim 1, wherein a particle size $D_{10}$ (nm) determined by the cumulative particle size distribution curve ranges from 0.70 to 0.95 times the particle size $D_{50}$ (nm).

5. The particulate abrasive according to claim 1, wherein a particle size $D_{90}$ (nm) determined by the cumulative particle size distribution curve ranges from 1.10 to 1.35 times the particle size $D_{50}$ (nm).

6. The particulate abrasive according to claim 1, wherein the particulate abrasive has an elemental composition satisfying the following requirements 1a to 3a:
1a) the particulate abrasive comprises at least one element selected from yttrium, gadolinium, terbium, dysprosium, holmium, erbium, thulium, ytterbium, and lutetium, in addition to cerium;
2a) the molar proportion of cerium in the particulate abrasive is 81 mol % or more; and
3a) the molar proportion of the at least one element selected from yttrium, gadolinium, terbium, dysprosium, holmium, erbium, thulium, ytterbium, and lutetium in the particulate abrasive is 19 mol % or less.

7. The particulate abrasive according to claim 1, wherein the particulate abrasive has an elemental composition satisfying the following requirements 1b to 3b:
1b) the particulate abrasive comprises at least one element selected from yttrium, gadolinium, terbium, dysprosium, holmium, erbium, thulium, ytterbium, and lutetium, in addition to cerium;
2b) the molar proportion of cerium in the particulate abrasive is 90 mol % or more; and 3b) the molar proportion of the at least one element selected from yttrium, gadolinium, terbium, dysprosium, holmium, erbium, thulium, ytterbium, and lutetium in the particulate abrasive is 10 mol % or less.

8. The particulate abrasive according to claim 1, wherein the molar proportion of cerium ranges from 95 to 100 mol %.

9. A method for producing the particulate abrasive according to claim 1, the method at least comprising:
   Step A of preparing an aqueous precipitant solution involving dissolving a precipitant in an aqueous solvent at room temperature into a predetermined concentration and heating the aqueous solution in a closed vessel;
   Step B of preparing an aqueous rare-earth salt solution containing at least cerium (Ce);
   Step C of preparing a reaction mixture involving placing the aqueous rare-earth salt solution prepared in Step B into an open vessel and feeding the aqueous precipitant solution cooled to room temperature from the closed vessel to the open vessel;
   Step D of generating a particulate abrasive precursor involving heating the reaction mixture with stirring in the open vessel;
   Step E of separating the particulate abrasive precursor generated in Step D from the reaction mixture; and
   Step F of producing a particulate abrasive involving calcining the particulate abrasive precursor separated in Step E in an oxidizing atmosphere.

10. A method for producing an abrasive that comprises the particulate abrasive according to claim 1, the method at least comprising:
    Step 1 of preparing an aqueous rare-earth salt solution containing at least cerium (Ce);
    Step 2 of placing the aqueous rare-earth salt solution prepared in Step 1 into a pressure vessel and heating the solution to 100° C. or higher;
    Step 3 of preparing a reaction mixture involving feeding, under pressure, a precipitant solution contained in an open vessel kept at 65° C. or lower to the aqueous rare-earth salt solution contained in the pressure vessel and heated to 100° C. or higher in Step 2;
    Step 4 of generating a particulate abrasive precursor involving heating the reaction mixture to 100° C. or higher with stirring in the pressure vessel;
    Step 5 of separating the particulate abrasive precursor generated in Step 4 from the reaction mixture; and
    Step 6 of producing a particulate abrasive involving calcining the particulate abrasive precursor separated in Step 5 in an oxidizing atmosphere.

11. The method for producing the abrasive according to claim 10, wherein the aqueous rare-earth salt solution has an elemental composition satisfying the following requirements 1c to 3c:
    1c) the aqueous rare-earth salt solution comprises at least one element selected from lanthanum (La), praseodymium (Pr), neodymium (Nd), samarium (Sm), europium (Eu), yttrium (Y), gadolinium (Gd), terbium (Tb), dysprosium (Dy), holmium (Ho), erbium (Er), thulium (Tm), ytterbium (Yb), and lutetium (Lu), in addition to cerium;
    2c) in the aqueous rare-earth salt solution, a sum of molar proportions of cerium and the at least one element selected from lanthanum, praseodymium, neodymium, samarium, and europium to all rare-earth elements to be contained in the particulate abrasive is 81 mol % or more; and
    3c) in the aqueous rare-earth salt solution, a molar proportion of the at least one element selected from yttrium, gadolinium, terbium, dysprosium, holmium, erbium, thulium, ytterbium, and lutetium to all rare-earth elements to be contained in the particulate abrasive is 19 mol % or less.

12. The method for producing the abrasive according to claim 10, wherein the aqueous rare-earth salt solution has an elemental composition satisfying the following requirements 1d to 3d:
    1d) the aqueous rare-earth salt solution comprises at least one element selected from yttrium, gadolinium, terbium, dysprosium, holmium, erbium, thulium, ytterbium, and lutetium, in addition to cerium;
    2d) in the aqueous rare-earth salt solution, the molar proportion of cerium to all rare-earth elements to be contained in the particulate abrasive is 81 mol % or more; and
    3d) in the aqueous rare-earth salt solution, the molar proportion of the at least one element selected from yttrium, gadolinium, terbium, dysprosium, holmium, erbium, thulium, ytterbium, and lutetium to all rare-earth elements to be contained in the particulate abrasive is 19 mol % or less.

13. The method for producing the abrasive according to claim 10, wherein the aqueous rare-earth salt solution has an elemental composition satisfying the following requirements 1e to 3e:
    1e) the aqueous rare-earth salt solution comprises at least one element selected from yttrium, gadolinium, terbium, dysprosium, holmium, erbium, thulium, ytterbium, and lutetium, in addition to cerium;
    2e) in the aqueous rare-earth salt solution, the molar proportion of cerium to all rare-earth elements to be contained in the particulate abrasive is 90 mol % or more; and
    3e) in the aqueous rare-earth salt solution, the molar proportion of the at least one element selected from yttrium, gadolinium, terbium, dysprosium, holmium, erbium, thulium, ytterbium, and lutetium to all rare-earth elements to be contained in the particulate abrasive is 10 mol % or less.

14. The method for producing the abrasive according to claim 10, wherein in the aqueous rare-earth salt solution, the molar proportion of cerium to all rare-earth elements to be contained in the particulate abrasive ranges from 95 to 100 mol %.

15. The method for producing the abrasive according to claim 10, wherein the precipitant in the precipitant solution is urea or a urea-based compound.

16. A method of polishing processing, comprising performing polishing with the abrasive produced by the method according to claim 9.

* * * * *